(12) United States Patent
Troeger et al.

(10) Patent No.: US 11,560,090 B2
(45) Date of Patent: *Jan. 24, 2023

(54) LIGHTING DEVICE FOR A SPORT UTILITY VEHICLE OR UTILITY TASK VEHICLE

(71) Applicant: Bestop, Inc., Louisville, CO (US)

(72) Inventors: Rick H. Troeger, Westminster, CO (US); Jose N. Vigil, Westminster, CO (US); George C. Stickles, Thornton, CO (US); Ronald Manzanares, Westminster, CO (US); Eric D. Getzschman, New Baltimore, MI (US)

(73) Assignee: Bestop Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/015,739

(22) Filed: Sep. 9, 2020

(65) Prior Publication Data

US 2020/0406818 A1 Dec. 31, 2020

Related U.S. Application Data

(63) Continuation of application No. 15/827,753, filed on Nov. 30, 2017, now Pat. No. 10,793,064.

(Continued)

(51) Int. Cl.
| | |
|---|---|
| *B60Q 3/59* | (2017.01) |
| *B60Q 3/51* | (2017.01) |
| *B60Q 3/40* | (2017.01) |
| *B60Q 3/60* | (2017.01) |
| *B60Q 3/74* | (2017.01) |
| *B60N 3/02* | (2006.01) |
| *B60Q 3/49* | (2017.01) |
| *B60Q 3/267* | (2017.01) |

(52) U.S. Cl.
CPC .............. *B60Q 3/59* (2017.02); *B60N 3/02* (2013.01); *B60N 3/023* (2013.01); *B60Q 3/267* (2017.02); *B60Q 3/40* (2017.02); *B60Q 3/49* (2017.02); *B60Q 3/51* (2017.02); *B60Q 3/60* (2017.02); *B60Q 3/74* (2017.02)

(58) Field of Classification Search
CPC ............ F21V 21/0816; F21V 21/0832; F21V 21/0008; B60Q 3/59; B60Q 3/49; B60Q 3/51; B60Q 3/40; B60Q 3/267; B60Q 3/60; B60Q 3/74; B60Q 3/02; B60Q 3/023

See application file for complete search history.

(56) References Cited

U.S. PATENT DOCUMENTS 4,483,380 A * 11/1984 Beran ....................... A45C 3/00
  206/315.1
4,523,258 A * 6/1985 Morse ................. F21V 33/0008
  362/108

(Continued)

*Primary Examiner* — Jong-Suk (James) Lee
*Assistant Examiner* — Christopher E Dunay
(74) *Attorney, Agent, or Firm* — Warn Partners, P.C.

(57) ABSTRACT

An accessory lighting assembly for vehicles. The accessory lighting assembly includes at least one attachment portion for selectively attaching the assembly to the vehicle wherever lighting is desired. The accessory lighting assembly includes at least one integrated lighting portion for selectively providing lighting to the interior of the vehicle. The accessory lighting assembly incorporates a grab handle for attaching to the at least one attachment portion for allowing a vehicle occupant a grip/handle for grabbing onto inside of the vehicle when desired.

9 Claims, 17 Drawing Sheets

Related U.S. Application Data

(60) Provisional application No. 62/481,934, filed on Apr. 5, 2017, provisional application No. 62/428,229, filed on Nov. 30, 2016.

(56) References Cited

U.S. PATENT DOCUMENTS

| | | | |
|---|---|---|---|
| 4,804,218 A | | 2/1989 | Hilliard |
| 5,611,590 A | * | 3/1997 | Filgueiras .............. B60J 3/0208 |
| | | | 296/97.1 |
| 5,829,656 A | * | 11/1998 | Reitz ........................ B62J 11/00 |
| | | | 224/417 |
| D836,529 S | * | 12/2018 | Feng ............................ D12/222 |
| 2003/0111856 A1 | | 6/2003 | Hewett |
| 2005/0213315 A1 | | 9/2005 | Jones |
| 2006/0076378 A1 | | 4/2006 | Hall |
| 2006/0104072 A1 | * | 5/2006 | Chen ...................... B60Q 3/267 |
| | | | 362/493 |
| 2011/0226826 A1 | | 9/2011 | Owen |
| 2013/0301289 A1 | * | 11/2013 | Durkin ..................... B60Q 3/85 |
| | | | 362/544 |
| 2013/0313853 A1 | * | 11/2013 | Marcus ...................... B60J 3/02 |
| | | | 296/97.9 |
| 2016/0223149 A1 | | 8/2016 | Gerpheide et al. |
| 2018/0147981 A1 | | 5/2018 | Troeger et al. |

\* cited by examiner

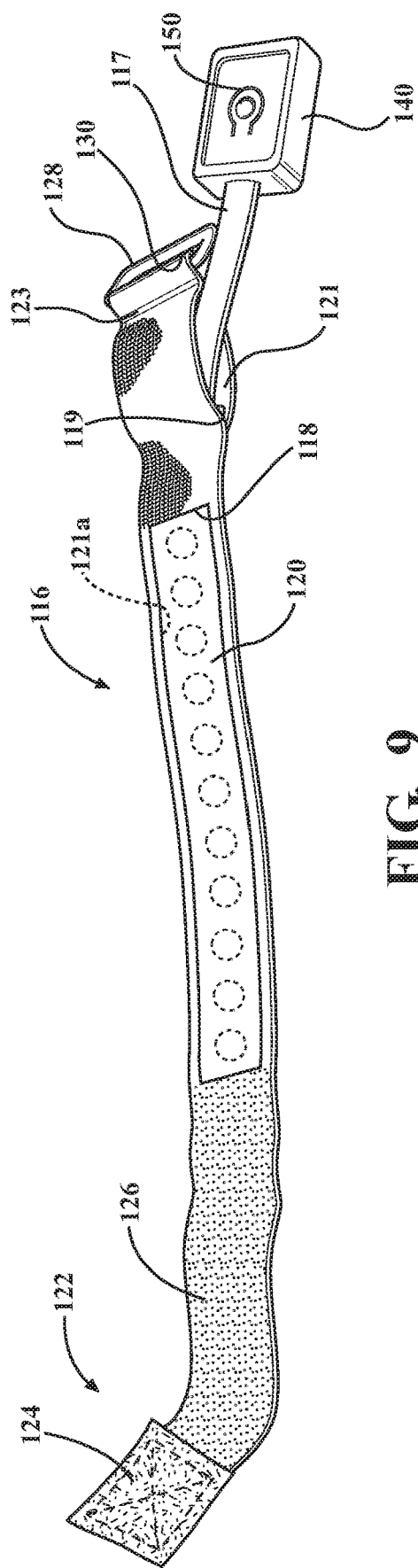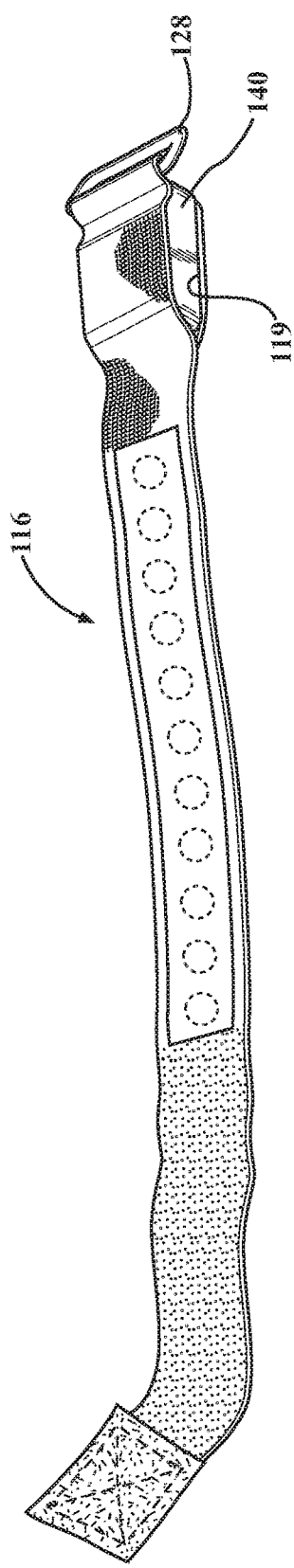

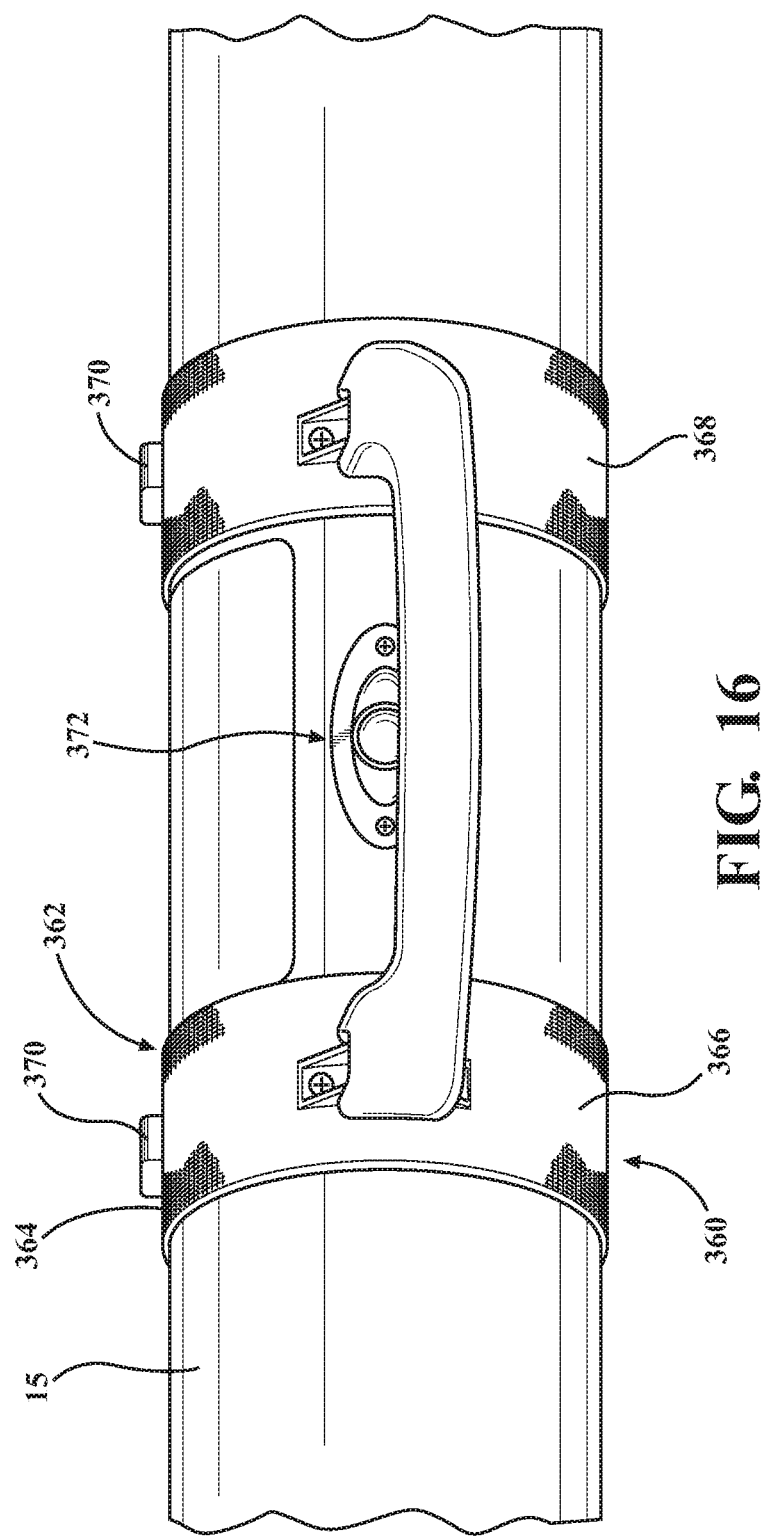

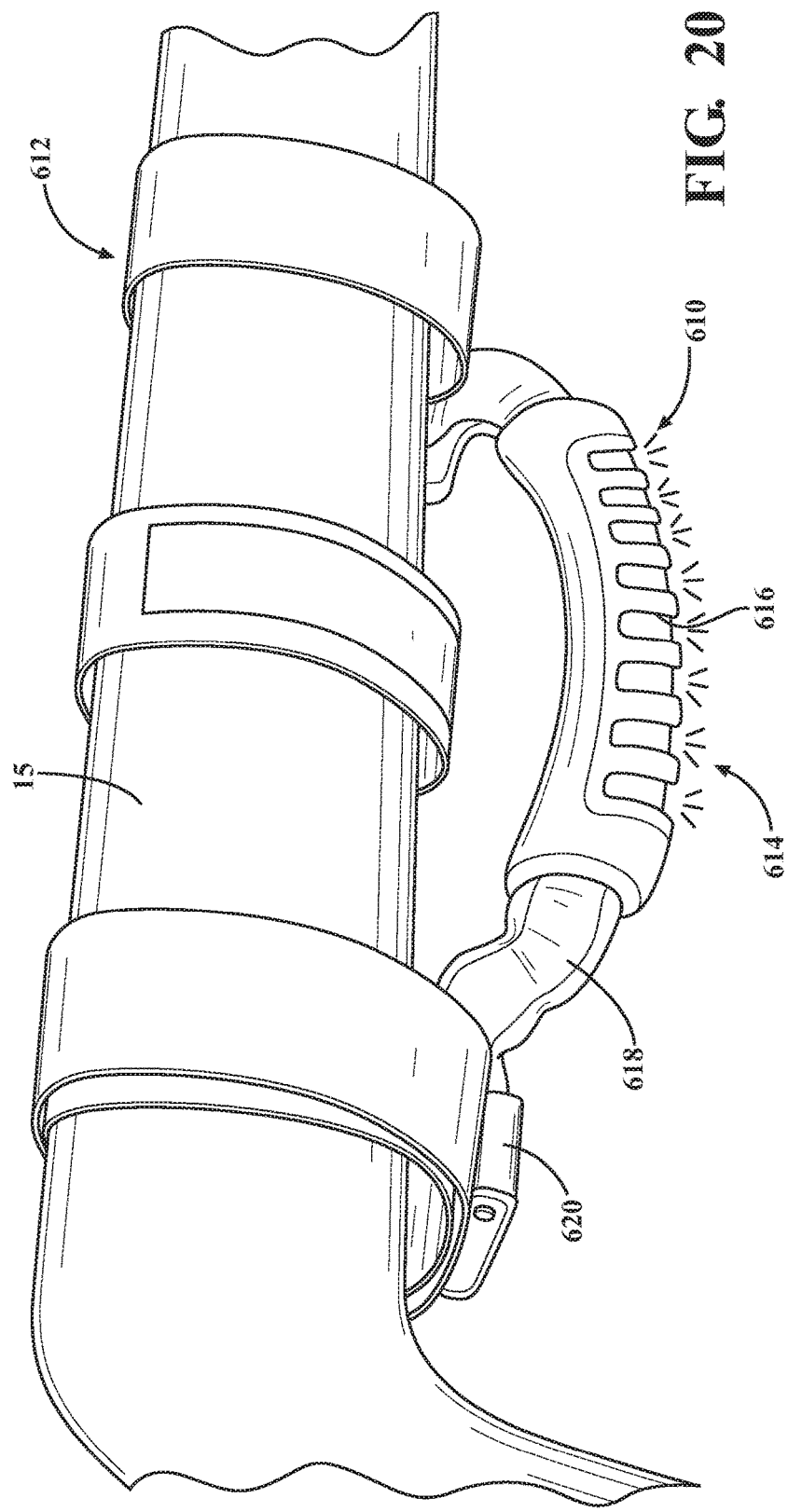
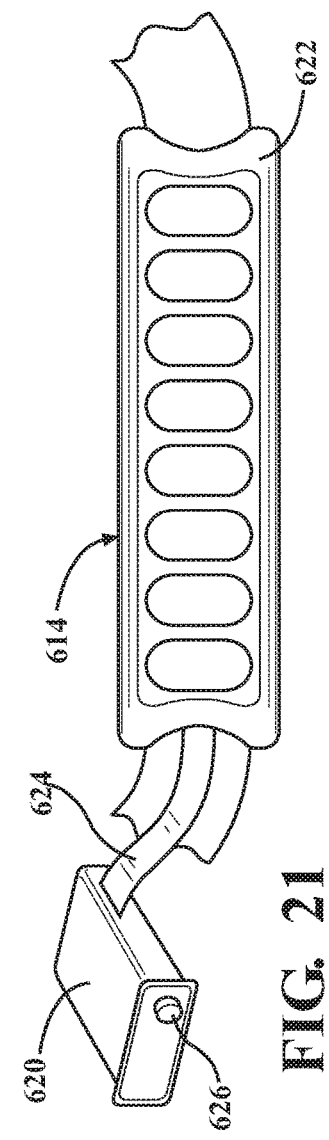

LIGHTING DEVICE FOR A SPORT UTILITY VEHICLE OR UTILITY TASK VEHICLE

CROSS-REFERENCE TO RELATED APPLICATIONS

The instant application is a continuation of U.S. patent application Ser. No. 15/827,753, filed Nov. 30, 2017, which claims the benefit of U.S. Provisional Application No. 62/428,229, filed Nov. 30, 2016 and U.S. Provisional Application No. 62/481,934, filed Apr. 5, 2017. The disclosures of the above applications are incorporated herein by reference.

FIELD OF THE INVENTION

The present invention relates to lighting accessories for vehicle interiors.

BACKGROUND OF THE INVENTION

Vehicle interiors, such as of sport-utility vehicles (SUVs) and utility task vehicles (UTVs), pickup trucks, and side by side UTVs, in general lack illumination. Typically vehicle interiors also do not have lighting that is portable to be moved to any suitable location in the interior of the vehicle as the owner desires.

One common example of areas that lack lighting or desirable amount of lighting is sport bars and/or cross car members. Another is the rear cargo area. Yet another are grab handles for grasping to get into/out of the vehicle. Yet another example are roof soft tops that are commonly used in 4-door and/or 2-door SUVs and UTVs, such as hard tops and/or foldable soft tops roof, which are typically moveable between at least a sunroof position and a closed position. The soft top cover material is typically comprised of fabric, twill acrylic fabric, multi-layer sailcloth fabric, or any other suitable flexible material and combinations thereof. However, since it is difficult to effectively mount components to the soft top cover and to provide power sources, typical interiors of soft top vehicles often lack amenities such as lighting. There are many lighting products out there that stick to surfaces with magnets, adhesives, etc. There are many grab handles and grab bars to provide stability.

There remains a need in the art for a lighting device that is portable and/or integrated into a vehicle component for improved illumination of vehicle interiors.

SUMMARY OF THE INVENTION

According to the present invention, there is provided an accessory lighting device assembly for SUVs and/or UTVs. The lighting device is selectively attached anywhere on the interior structure of the vehicle or is incorporated with an interior component such as a grab handle or roof top assembly. The lighting device has at least one lighting portion that includes at least one lighting source, e.g., light emitting diode or any other lighting source, and a light distribution member, cover or light guide. The lighting device also includes at least one attachment portion for attaching the lighting device to the vehicle and/or to the component. The lighting device has a predetermined ON/OFF feature and at least one power source is provided.

According to an aspect of the present invention, the present invention combines both illumination and stability at a very accessible area. There is provided an accessory grab handle for a vehicle that included an attachment portion for attaching said accessory to a vehicle, a handle portion for allowing a passenger a handle for grabbing onto inside of the vehicle, and, an integrated lighting portion for selectively providing lighting to the interior of the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 9 is a perspective view of an attachment portion of the lighting assembly of FIG. 8, in accordance with the present invention;

FIG. 10 is a perspective view of an attachment portion of the lighting assembly of FIG. 8, in accordance with the present invention;

FIG. 16 is a perspective view of an accessory lighting assembly incorporating a lighting portion and spring loaded grab handle, according to an aspect of the present invention;

FIG. 20 is a perspective view of an accessory lighting assembly incorporating a lighting portion and grab handle, according to an aspect of the present invention;

FIG. 21 is a bottom plan view of the grab handle of FIG. 20; and

DETAILED DESCRIPTION OF THE PREFERRED EMBODIMENTS

Figure 1:
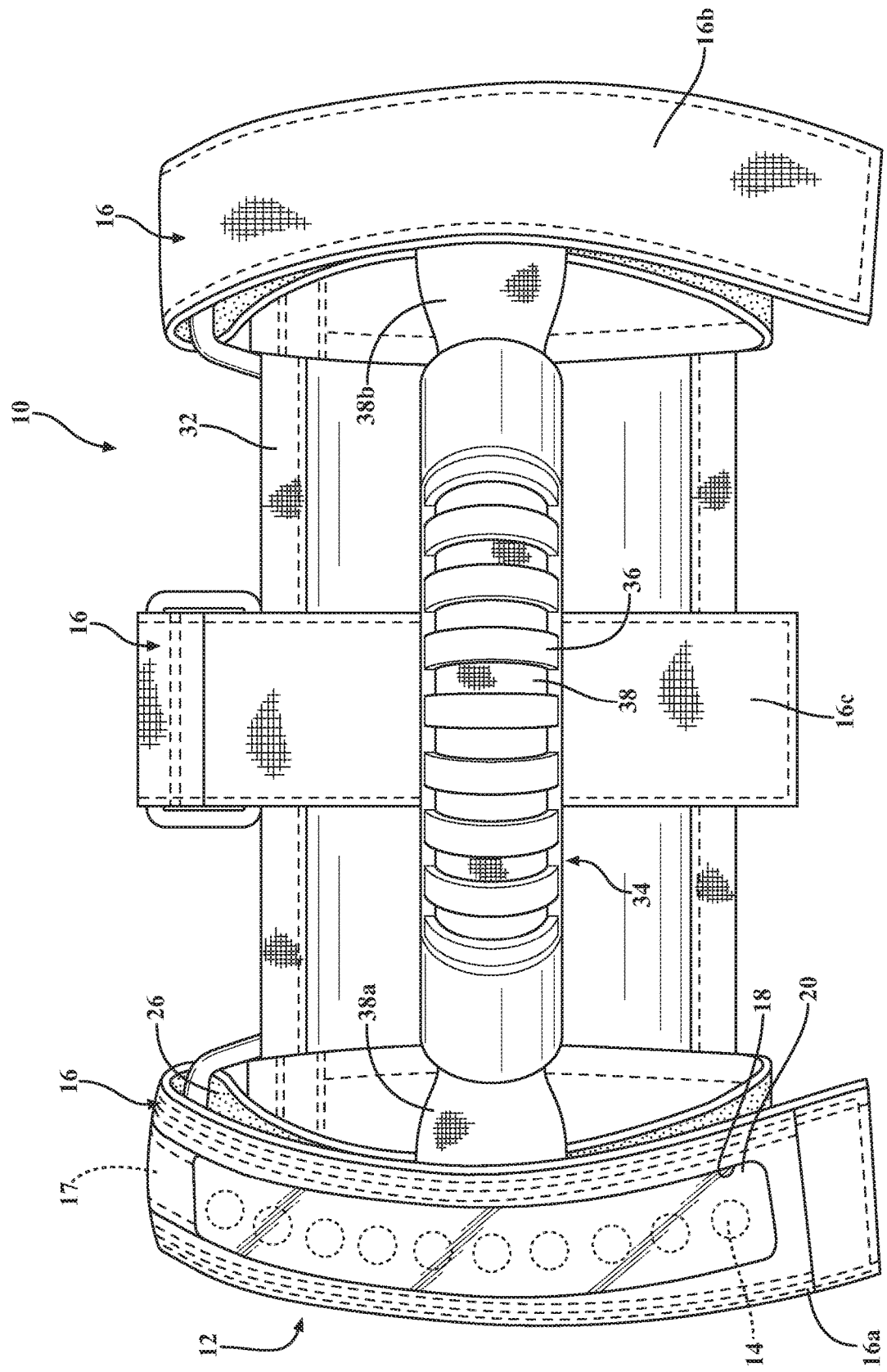
FIG. 1 is a front perspective view of an accessory lighting assembly incorporating a lighting portion, according to the present invention.
Figure 2:
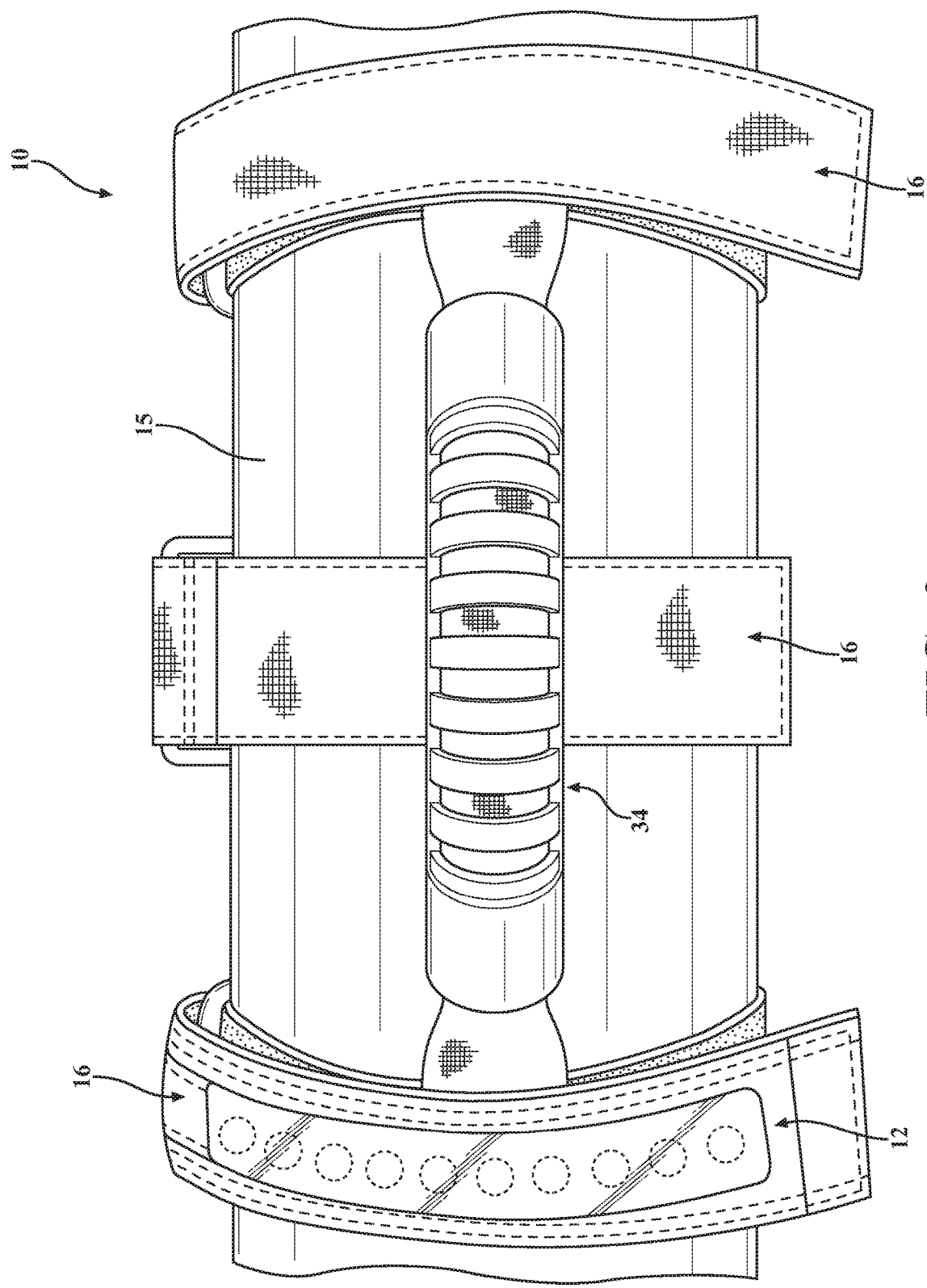
FIG. 2 is the accessory lighting assembly of FIG. 1 depicted on a sport bar to illustrate an exemplary environment of use.
Figure 3:
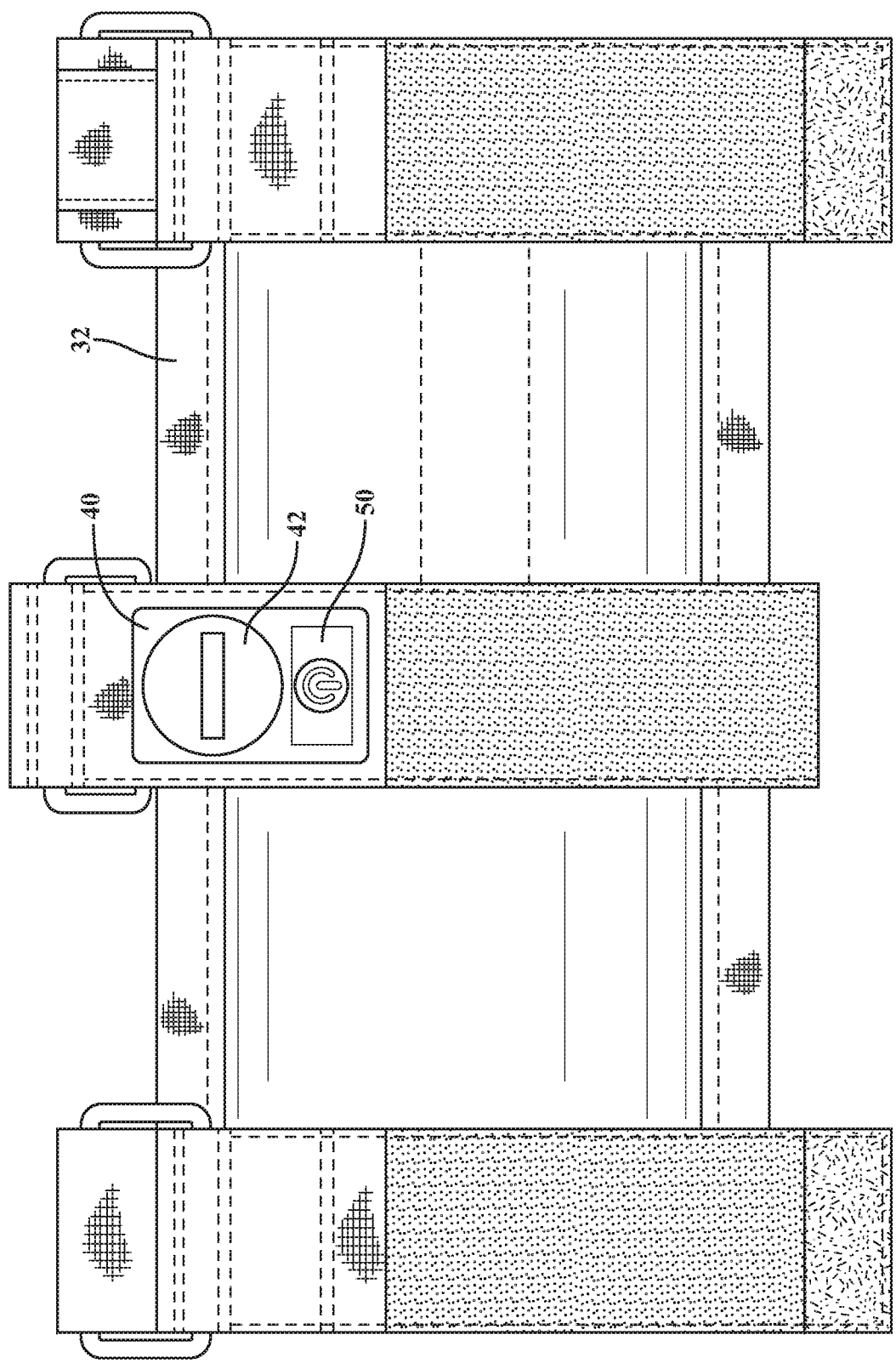
FIG. 3 is a rear perspective view of FIG. 1.
Figure 4:
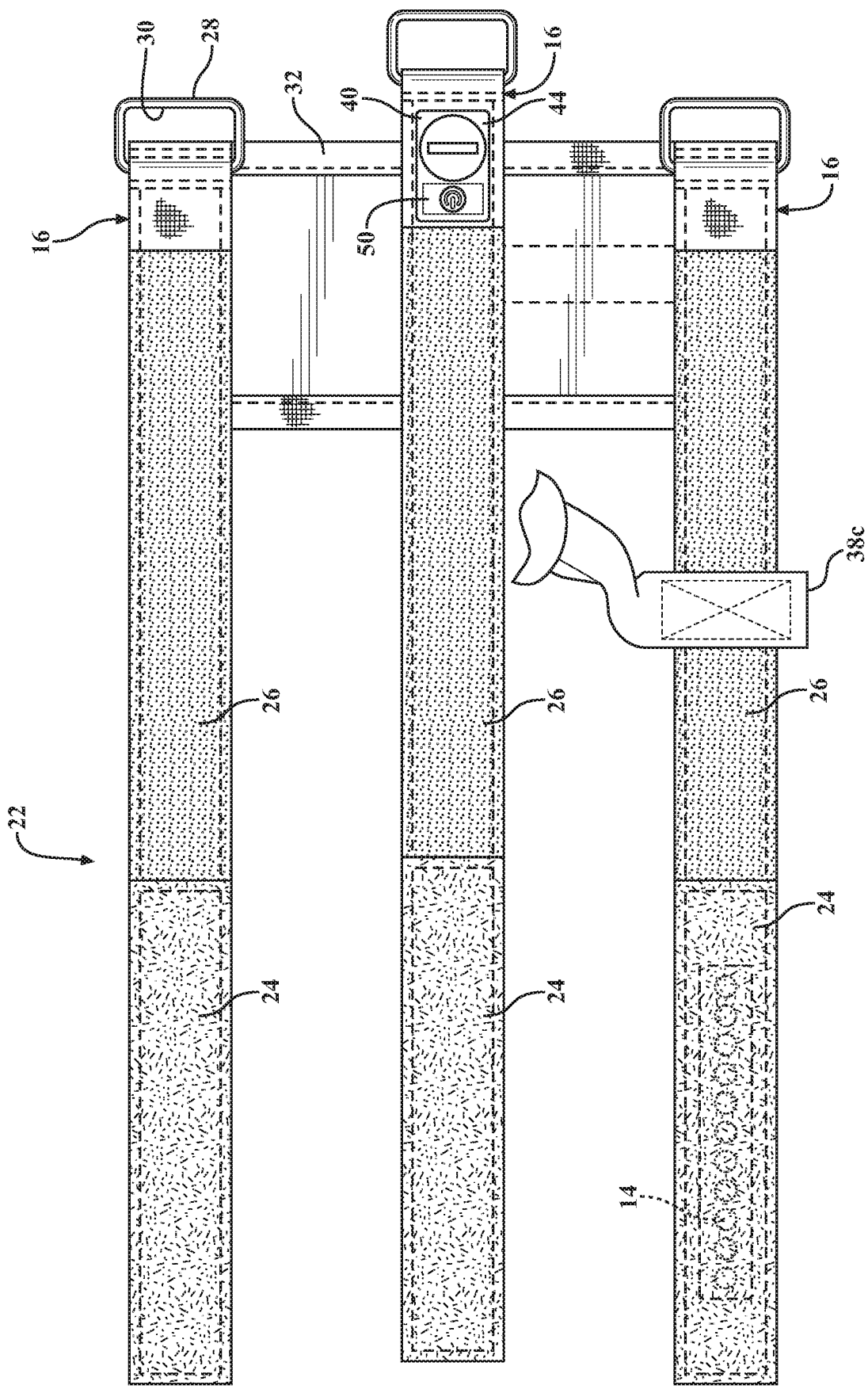
FIG. 4 is a rear elevation view of the accessory lighting assembly of FIG. 1 in an open position, in accordance with the present invention.
Figure 5:
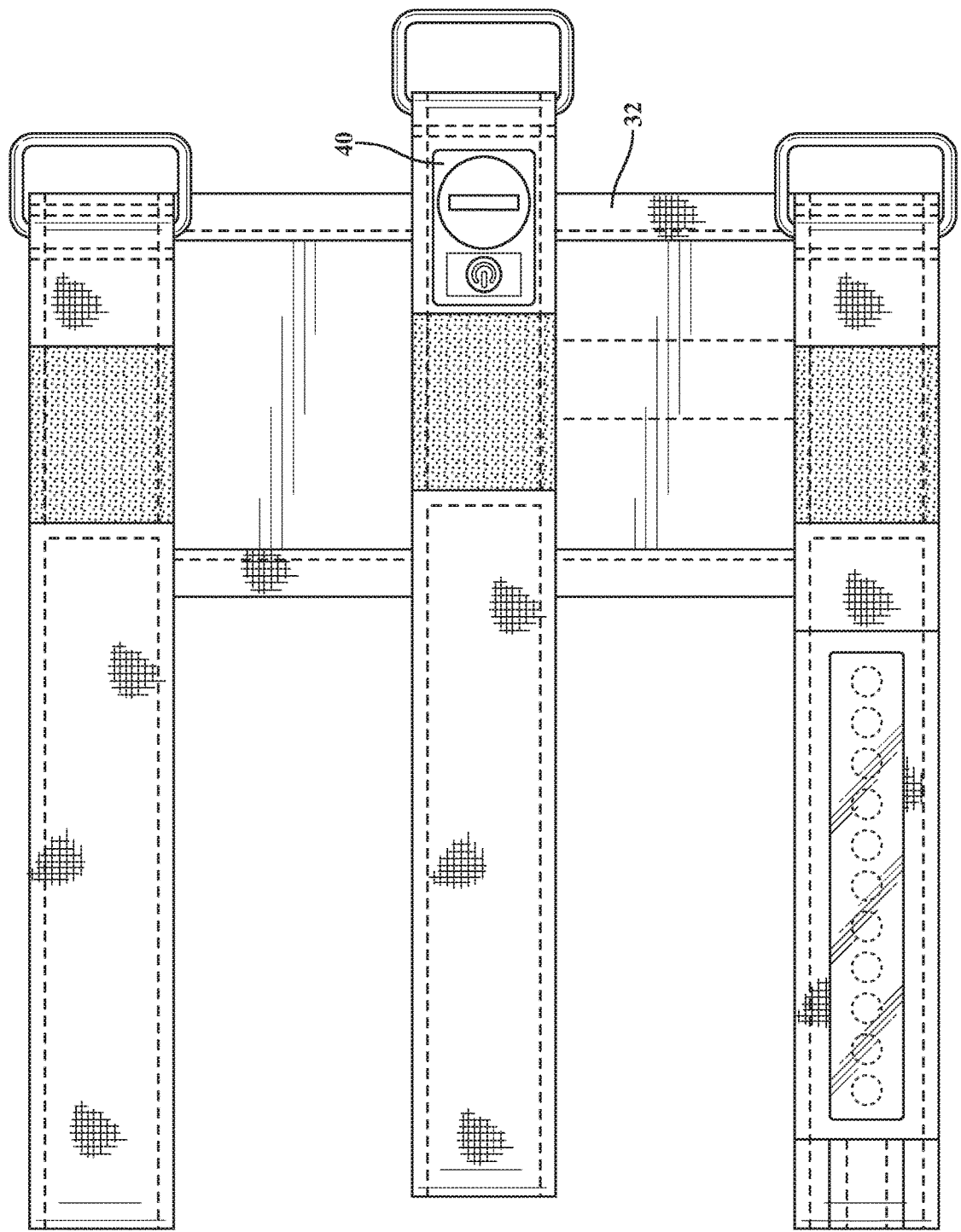
FIG. 5 is an enlarged rear elevation view of FIG. 4 but with a plurality of straps partially folded over onto respective fastener portions, in accordance with the present invention.
Figure 6:
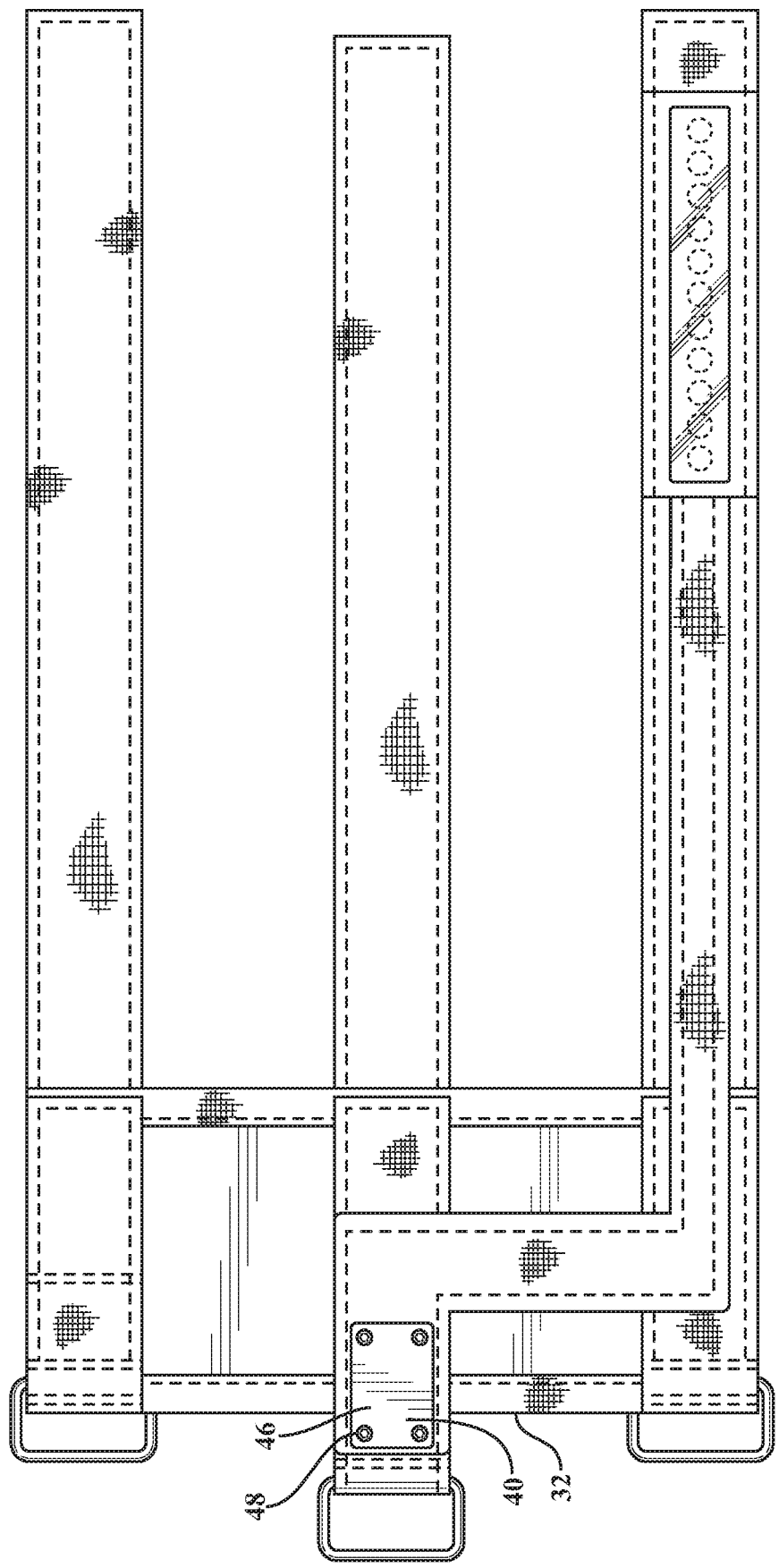
FIG. 6 is a front elevation view of the accessory lighting assembly of FIG. 1 in an open position, with a grab handle removed for clarity, in accordance with the present invention.

The following description of the preferred embodiment(s) is merely exemplary in nature and is in no way intended to limit the invention, its application, or uses.

Referring to the figures generally, a lighting device assembly is provided. According to an embodiment of the present invention, the lighting device assembly has an attachment member and is portable for attachment in various locations within the vehicle, e.g., selectively attached for locating where desired within the vehicle, and/or, the lighting device is integrated with another predetermined component, e.g., roof/cover assemblies, grab handles, sport bar covers, headliners, headers, bows, visors, mountable displays, cargo containers/restraints, door rails, door sill plates, kick plates, trim/moldings, pillars, cross car members, fabric sleeves or liners for sport bars, or any other component or "secondary component", etc.

Referring now to FIGS. 1-6 generally, an accessory lighting assembly shown generally at 10 is provided, according to the present invention, which is an illuminating grab handle assembly. The accessory lighting assembly 10 has at least one lighting portion shown generally at 12. The lighting portion 12 includes at least one lighting source 14, preferably, the lighting source 14 is at least one light emitting diode (LED), most preferably, a plurality of LEDs, which may be the same or different colors or alternating colors.

At least one attachment portion shown generally at 16 attaches the assembly 10 to the vehicle. Preferably, a plurality of attachment portions 16 attach the assembly 10 to the vehicle. FIGS. 1-6 depict three attachment portion 16, however, more or less attachment portions 16 can be used depending on the application without departure from the scope of the present invention. The at least one attachment portion 16 attaches to a sport bar 15, e.g., such as a sport bar near a front or rear door, to assist occupant entry in/out of the vehicle. Alternatively, the at least one attachment portion 16 attaches to any other vehicle component/location desired, e.g., A-pillar, B-pillar, D-pillar, cross car members, without departure from the scope of the present invention. The accessory lighting assembly 10 is portable and selectively removable to allow placement, and replacement, anywhere in the vehicle that is desired by the user, e.g., vehicle cabins, automotive interior cabs, pickup beds, trailers, recreational vehicles, etc.

The lighting portion 12 is connected to one of the attachment portions 16. The lighting portion 12 is preferably inserted into the attachment portion 16, such as inserted into a web strap. Alternatively, the lighting portion 12 is attached outside the attachment portion 16, e.g., sewn and/or adhered.

The lighting portion 12 is preferably rope light like, or is strip light like, or any other suitable lighting of any kind for accessory illumination.

The lighting portion 12 includes a housing 17 that is preferably transparent. Alternatively, the housing 17 is translucent or clear. Optionally, the housing 17 is tinted. The housing 17 is preferably tubing that is formed of polyvinyl chloride or any other material suitable for protecting the lighting sources 14 and allowing illumination. The lighting source(s) 14 is/are mounted within the housing 17. An opening 18 provided in the attachment portion 16 allows emitting light. A cover 20 is connected, e.g., sewn and/or adhered, to the attachment portion 16 to close off the opening 18. The cover 20 is preferably translucent. Alternatively, the cover 20 is transparent or clear. Optionally, the cover 20 is tinted.

The housing 17 is of predetermined width and length suitable to provide illumination through the opening 18 of the at least one attachment portion 16. The housing 17 of the light portion 12 is wide enough to at least extend the width of the opening 18 and long enough to at least extend the length of the opening 18 behind the cover 20, according to an embodiment of the present invention. Alternatively, the assembly 10 has no cover 20 and the generally snug fit against the strap and size of the housing 17 is operable to sufficiently close off the opening 18 in that the housing 17 of the light portion 12 is wide enough to at least extend the width of the opening 18 and long enough to at least extend the length of the opening 18 and is generally pressed against the strap opening surround.

Optionally, any additional lighting portions 12 are connected to any other respective attachment members 16, e.g., a lighting portion 12 on each of the three attachment members 16, or on two attachment portions 12, and the corresponding features are as set forth previously. Optionally, a lighting portion 12 is provided on a grab handle portion. Optionally, a lighting portion 12 is provided on a body portion.

The at least one attachment portion 16 is preferably a strap, e.g., fabric strap or web strap, having at least one fastener, preferably, at least two fasteners, connected to the strap, e.g., sewn. Preferably, at least one first fastener shown generally at 22 includes at least one hook portion 24 and at least one loop portion 26 attached to the attachment portion 16 (e.g., interlocking "tongue and loop" or "hook and loop" or pile). By way of non-limiting example, the first fastener 22 is supplied by Velcro® At least one second fastener 28, e.g., such as a buckle, snap, slide, D-ring, multi-prong fastener, loop, etc, is attached to the attachment portion 16, e.g., retention pocket sewn. The second fastener 28 is sized to receive the attachment portion strap through at least one opening 30 for attachment to the vehicle.

A body portion 32 of the assembly 10, e.g., a fabric panel, is attached to the at least one attachment portion 16. FIGS. 1-6 depict the body portion 30 attached to three attachment portions 16 in a direction transverse to the longitudinal axis of the three attachment portions 16. The attachment portions are spaced a predetermined distance apart and sewn, or otherwise suitably connected, to the body portion 32.

The assembly 10 includes a grab handle portion shown generally at 34. The grab handle portion 34 includes a grip member 36 that a user can grasp for assistance when desired, such as to aid in getting into the vehicle. The grip 36 is connected to at least one attachment member 38 that is preferably a strap, e.g., fabric strap or web strap. Preferably, the attachment member 38 is connected to the attachment portion 16, e.g., sewn to the attachment portion 16, or selectively slid onto the attachment portion 16, etc. One end 38a of the attachment member 38 is attached, e.g., sewn, to one end attachment portion 16a, and another end 38b of the attachment member is attached, e.g., sewn, to the other end attachment portion 16b in respective predetermined locations. Preferably, the ends 38a,38b both include a sewn loop 38c to slide the ends 38a,38b of the grab handle portion 34 onto the respective attachment portions 16a,16b. This allows a simple attachment and adaptability/adjustability of the assembly 10 to various vehicles and vehicle attachment locations. If one or more middle attachment portions 16c are used, preferably the attachment member 38 is not connected to the middle attachment portion 16c so that a user has space to grasp the grip member 36.

Figure 22:
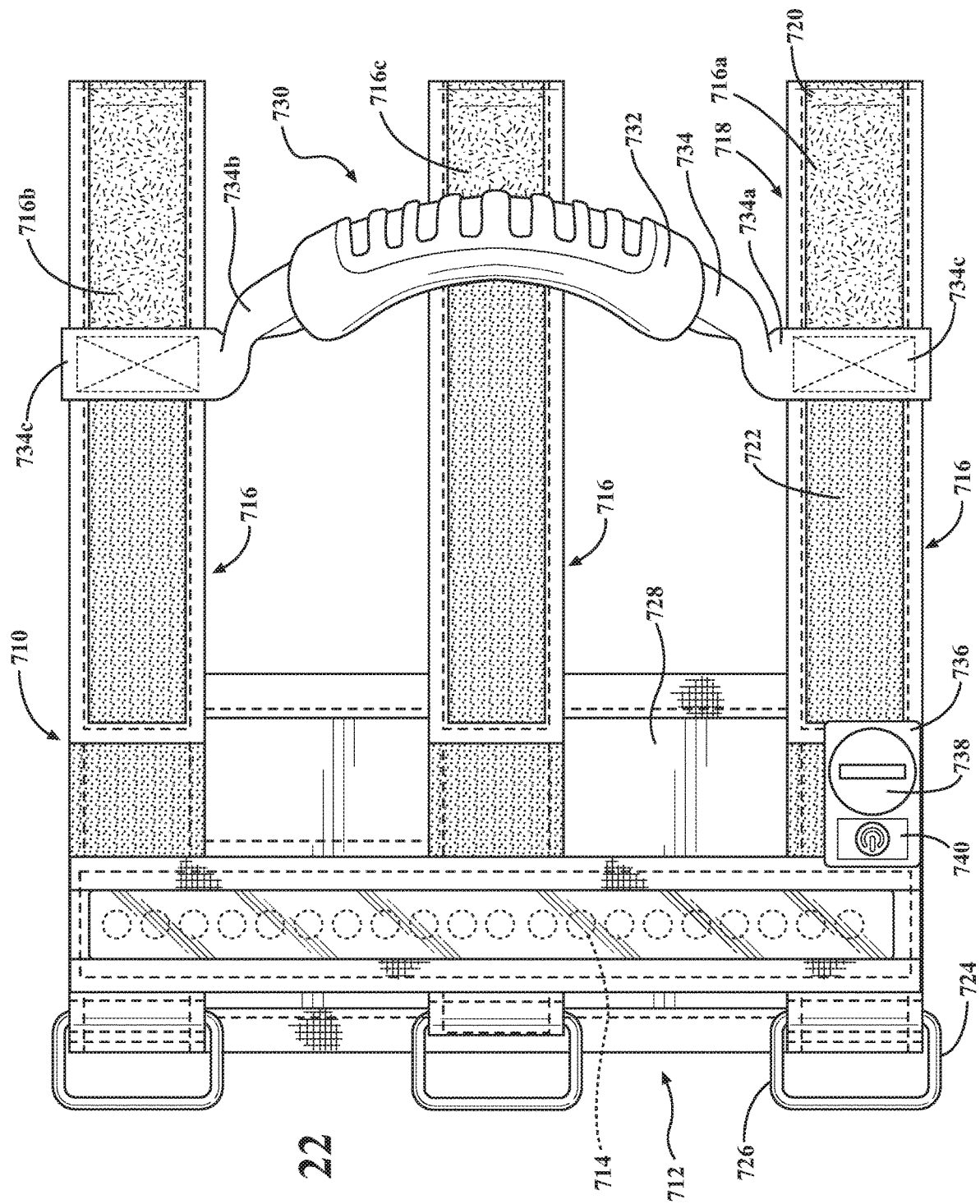
FIG. 22 is a front perspective view of an accessory lighting assembly incorporating a lighting portion and grab handle, according to the present invention.

Alternatively, the lighting portion 12 is at least one light strip, such as depicted in FIG. 22, attached, e.g., sewn, to at least one attachment portion 16 and/or any other location on the assembly 10, e.g., on either side of the body portion 32 transverse or parallel to the longitudinal axis of the attachment portion 16 and/or on the grab handle 34, etc., depending on the application without departure from the scope of the present invention.

The lighting portion 12 is battery powered with a sealed, replaceable and/or rechargeable battery. A housing 40 containing at least one battery includes an access port and battery cover 42 for selectively replacing or recharging the battery. The battery powers the lighting portion 12. Alternatively, the lighting portion 12 is adaptable for solar power. The housing 40 is connected to the attachment portion 16, e.g., by at least one fastener, sewn into a pocket, and/or adhered. Preferably, the housing 40 is a two piece housing including a first half 44 connected to a second half 46 by at least one fastener 48, e.g, screws, with the strap of the attachment portion 16 sandwiched between the first and second halves 44,46 and the at least one fastener 48 extending through the strap. While the housing 40 is depicted connected to the middle attachment portions 16c, it is understood that the housing 40 can be connected at any alternative location on the assembly 10 depending on the application without departure from the scope of the present invention. It is also understood that more than one lighting portion 12 can be connected to the housing 40 and powered by the battery.

An ON/OFF button 50 or a switch for the lighting portion 12 is provided on the housing 40. The button 50 turns the lighting portion 12 on/off. It is understood that more than one lighting portion 12 can be connected to the housing 40 and controlled by the ON/OFF button 50.

To attach the assembly 10 to the vehicle each attachment portion 16 is first extended to its full length. The assembly 10 is then aligned to the vehicle such that the body portion 32 is placed adjacent to the sport bar 15 to which attachment is desired, or any other vehicle attachment location desired. The attachment portion 16 is wrapped around the sport bar 15 and fed through the at least one opening 30 of the second fastener 28, e.g., buckle, and pulled tight. The first fastener 22 of the attachment portion 16 is then fastened, e.g., the loop portion 24 of the operably taut strap 16 is brought over the hook portion 26 of the strap 16 and pressed together. This is repeated for each additional attachment portion 16. Once installed, the grab handle portion 34 is easily assessable to a user for grasping and pulling as desired. The ON/OFF button 50 on the housing 40 for turning the at least one lighting portion 12 on/off is also easily assessable, yet generally hidden from view when seated in the vehicle interior when desired.

The illuminated grips provide illumination of cabin or surrounding area as well as stability entering, exiting vehicle and stability while driving on rough surfaces.

While a grab handle assembly is depicted and described, it is understood that the assembly 10 could be an integrated feature not only into a grab handle, but with any sport bar mounted accessory as an additional feature or any other vehicle component depending on the application without departure from the scope of the present invention.

Figure 7:
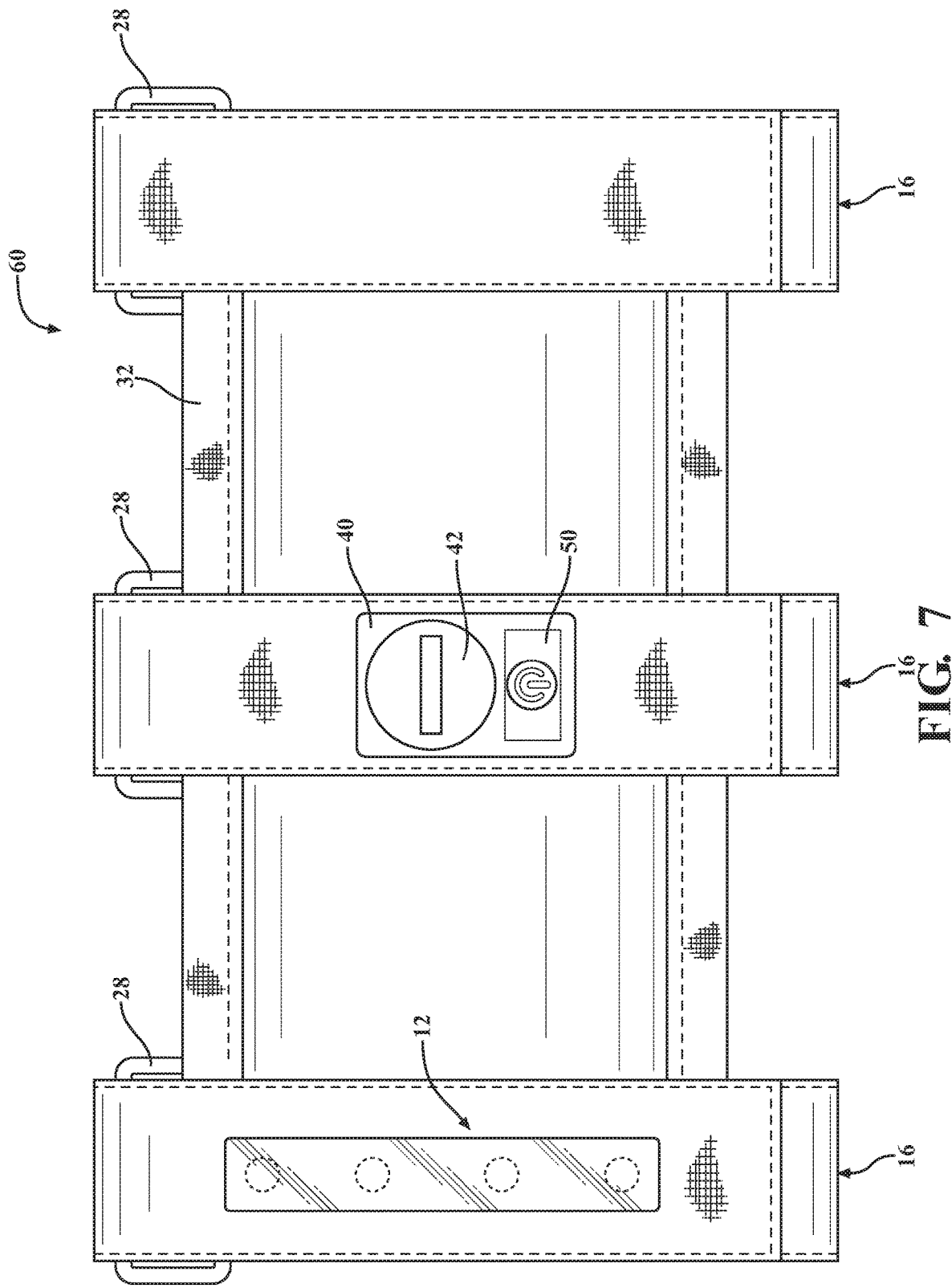
FIG. 7 is a front elevation view of an accessory lighting assembly incorporating a lighting portion, in accordance with the present invention.

FIG. 7 depicts an accessory lighting assembly shown generally at 60, according to an embodiment of the present invention, similar to the accessory lighting assembly 10, wherein like numbers indicate like parts, except that the assembly 60 has no grab handle portion and the ON/OFF button 34 is on the same side as the lighting portion 12 when in the installed position. The assembly 60 includes at least one attachment portion 16, preferably, a plurality of attachment portions 16, with hook and loop portions for connecting to a sport bar 15 or any other vehicle component, as described previously. At least one lighting portion 12 is provided on at least one of the attachment portions 16. At least one housing 40 is provided on at least one attachment portion 16 to house the battery for powering at least one lighting portion and for the ON/OFF button for controlling the at least one lighting portion. Since there is no grab handle, this assembly 60 is primarily an illumination accessory. It is adaptable for placement anywhere inside the vehicle where additional lighting is desired. It is understood that the housing 40 can be connected to another location on the attachment portion 16 or elsewhere on the assembly 10 to generally hide the housing 40 from view when an occupant is seated in the vehicle interior while still allowing easy access to turn the lighting portion on/off.

Referring now to FIGS. 8-11 generally, a accessory lighting assembly shown generally at 110 is provided, according to the present invention, which is an illuminating grab handle assembly. The accessory lighting assembly 110 has at least one lighting portion shown generally at 112. The lighting portion 112 includes at least one lighting source 114, preferably, the lighting source 114 is at least one light emitting diode (LED), most preferably, a plurality of LEDs, which may be the same or different colors or alternating colors.

At least one attachment portion shown generally at 116 attaches the assembly 110 to the vehicle. Preferably, a plurality of attachment portions 116 attach the assembly 110 to the vehicle. FIGS. 8-11 depict two attachment portion 116, however, more or less attachment portions 116 can be used depending on the application without departure from the scope of the present invention. The at least one attachment portion 116 attaches to a sport bar 115, e.g., such as near door sport bar to assist occupant entry in/out of the vehicle. Alternatively, the at least one attachment portion 116 attaches to any other vehicle component/location desired, e.g., A-pillar, B-pillar, D-pillar, cross car members, without departure from the scope of the present invention. The accessory lighting assembly 110 is portable and selectively removable to allow placement, and replacement, anywhere in the vehicle that is desired by the user.

The lighting portion 112 is connected to one of the attachment portions 116. The lighting portion 112 is preferably inserted into the attachment portion 116, such as inserted into a web strap. Alternatively, the lighting portion 112 is attached outside the attachment portion 116, e.g., sewn and/or adhered.

The lighting portion 112 includes a housing 117 that is preferably transparent. Alternatively, the housing 117 is translucent. Optionally, the housing 117 is tinted. At least one lighting source 114, preferably one LED, is placed adjacent to or within the housing 117. The housing 117 is preferably a light distribution member of the assembly 110, such as a molded piece of predetermined contour, etc, which light distribution member distributes light substantially down the full length of the piece. According to an embodiment of the present invention, the housing 117 is a light guide. Incorporating predetermined internal features within the housing 117 suitable for directing illumination as desired is within the scope of the present invention. Alternatively, instead of a single LED 14 piped through the light distribution member, a strip of discrete LEDs could be used with or without the attachment portion 116, depending on the application without departure from the scope of the present invention.

An opening 118 provided in the attachment portion 116 allows emitting light. A cover 120 is connected, e.g., sewn and/or adhered, to the attachment portion 116 to close off the opening 118. The cover 120 is preferably translucent. Alternatively, the cover 120 is transparent or clear. Optionally, the cover 120 is tinted.

The housing 117 is of predetermined width and length suitable to provide illumination through the opening 118 of the at least one attachment portion 116. The lighting portion 112 is side fed through a second opening 119 of a pocket 121 formed in the strap 116 and into a longitudinal pocket 121a extending along the longitudinal axis of the strap 116. The pocket and a first end 123 of the attachment portion 116 retains the lighting portion 112 within the attachment portion 116 by abutting against the first end 123 to prevent the housing lighting portion 112 from backing out of the pocket 121 when not desired. The first end 123 is sewn and/or adhered or bonded to close off the end. The second opening 119 allows an operator to selectively remove the lighting portion 112 for maintenance or replacement.

Optionally, any additional lighting portions 112 are connected to any other respective attachment members 116, e.g., a lighting portion 112 on each of the three attachment members 116, or on two attachment portions 112, and the corresponding features are as set forth previously. Optionally, a lighting portion 112 is provided on a grab handle portion.

The at least one attachment portion 116 is preferably a strap, e.g., fabric strap or web strap, having at least one fastener, preferably, at least two fasteners, connected to the strap, e.g., sewn. FIGS. 9-10 depict the attachment portion 116, with other parts of the assembly 110 removed for clarity, including a first fastener shown generally at 122 that has a hook portion 124 and loop portion 126 attached to the attachment portion 116. By way of non-limiting example, the first fastener 122 is supplied by Velcro®. A second fastener 128, e.g., such as a buckle, snap, slide, D-ring, multi-prong fastener, loop, etc, is attached toward the end of the attachment portion 116, e.g., retained by sewn strap end pocket. The second fastener 128 is sized to receive the attachment portion strap through at least one opening 130 for attachment to the vehicle.

Figure 8:
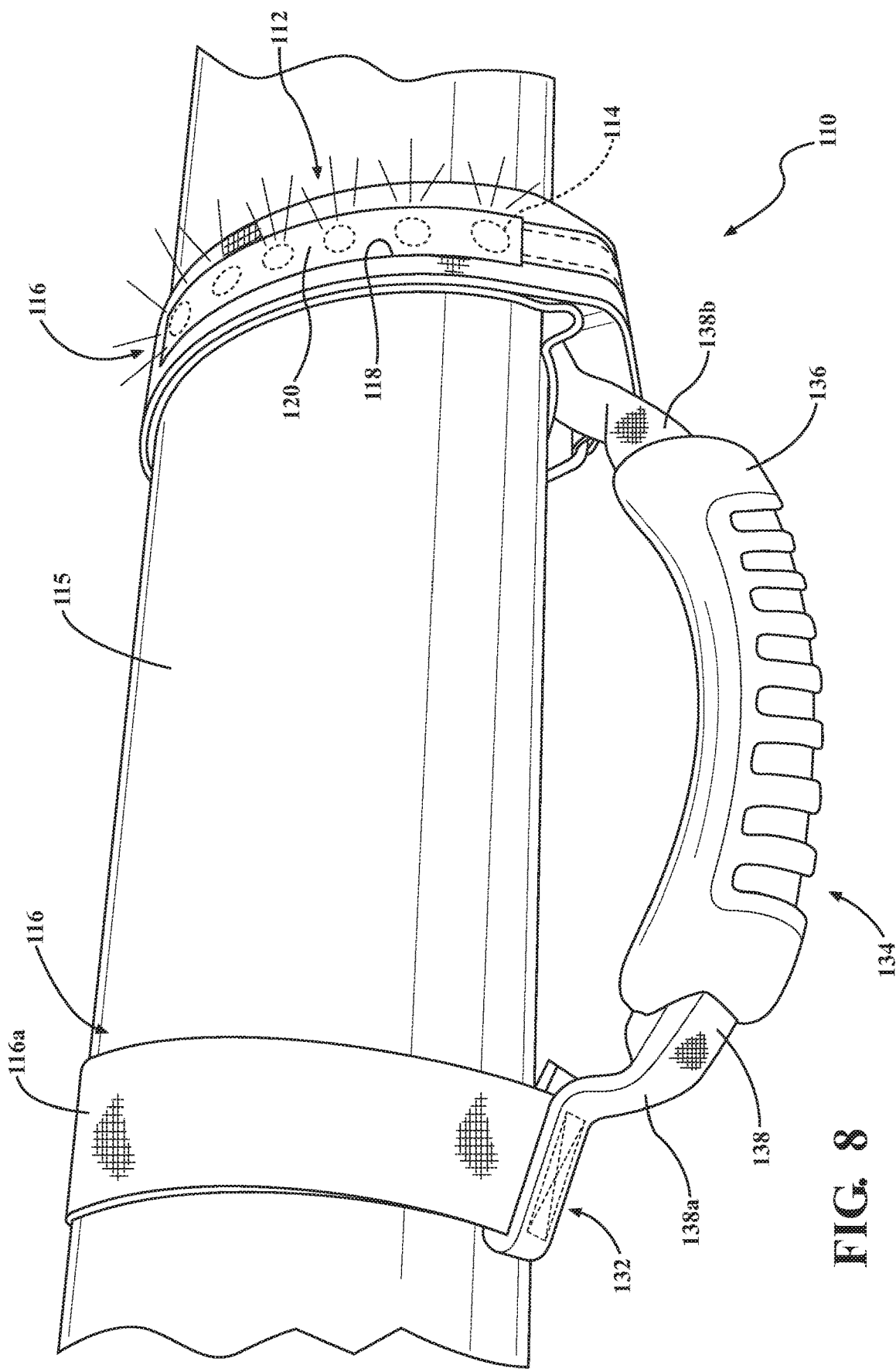
FIG. 8 is a front elevation view of an accessory lighting assembly incorporating a lighting portion, in accordance with the present invention.

Preferably, at least two attachment portions 116 are provided, wherein one or more of the attachment portions 116 includes a respective lighting portion 112. FIG. 8 illustrates one attachment portion 116 that is a strap 116a, with identical first and second fasteners 122,128 as depicted in FIGS. 9-10, but without a lighting portion 112 and openings in the strap for a lighting portion 112. As indicated generally at 132, an accessory is attachable to the strap 116a.

The assembly 110 includes a grab handle portion shown generally at 134. The grab handle portion 134 includes a grip member 136 that a user can grasp for assistance when desired, such as to aid in getting into the vehicle. The grip 136 is connected to at least one attachment member 138 that is preferably a strap, e.g., fabric strap or web strap. Preferably, the attachment member 138 is attached to the attachment portion 116 having the lighting guide 112, and is attached to the attachment portion 116a that does not have the lighting guide 112. Preferably, one end 138a of the attachment member 138 is connected to one end attachment portion 116a, and another end 138b of the attachment member is attached to the other attachment portion 116 having the lighting portion 112, e.g., sewn or captured between the hook and loop portions 124, 126, or slid onto the portion 116a, etc. Most preferably, a loop 132 is provided at both ends 138a,138b to slide the grab handle portion 134 onto the respective attachment portions 116, 116a. More or less than two attachment portions 116 are contemplated depending on the application without departure from the scope of the present invention. If one or more middle attachment portions are used, preferably the attachment member 138 is not connected to any central attachment portion near the grip 136 so that a user has space to grasp the grip member 136. It is contemplated that the attachment portion 116 that has the lighting source 112 can be quickly removed from the assembly 110 for use as an illuminating accessory in the vehicle apart from the grab handle portion 134. This adds yet another degree of adjustability that is advantageous to users wherever additional lighting is desired.

The lighting portion 112 is battery powered with a sealed, replaceable and/or rechargeable battery. A housing 140 contains at least one battery and is connected to the housing 117 of the lighting portion 112. The housing 140 can include an access port and battery cover for selectively replacing or recharging the battery. The battery powers the lighting portion 112. Alternatively, the lighting portion 112 is adaptable for solar power.

The battery housing 140 is connected to lighting guide 112 housing 117, e.g., by at least one fastener, sewn into a pocket, bonded, clamped, mechanical interference, and/or adhered. The housing 140 is also selectively connected to the attachment portion 116. Preferably, the housing 140 fits into the pocket 121 of the attachment portion 116, but is easily assessable for maintenance or repair (see FIG. 128) via the opening 119. It is understood that more than one lighting portion 112 can be connected to the housing 140 and powered by the battery.

An ON/OFF button 150 or a switch for the lighting portion 112 is provided on the housing 140. The button 150 turns the lighting portion 150 on/off. It is understood that more than one lighting portion 112 can be connected to the housing 140 and controlled by the ON/OFF button 150.

To attach the assembly 110 to the vehicle each attachment portion 116 is first extended to its full length. The assembly 110 is then aligned to the vehicle such that the grab handle portion 134 is placed adjacent to the sport bar 115 to which attachment is desired, or any other vehicle attachment location/component desired. The attachment portion 116 is then wrapped around the sport bar 115 and fed through the at least one opening 130 of the second fastener 128, e.g., buckle, and pulled tight. The first fastener 122 of the attachment portion 116 is then fastened, e.g., the loop portion 124 of the operably taut strap 116 is brought over the hook portion 126 of the strap 116 and pressed together. This is repeated for each additional attachment portion 116. Once installed, the grab handle portion 134 is easily assessable to a user for grasping and pulling as desired. The ON/OFF button 150 on the housing 140 for turning the at least one lighting portion 112 on/off is also easily assessable, yet generally less visible from view when seated in the vehicle interior.

While a grab handle assembly is depicted and described, it is understood that the assembly 110 could be an integrated feature not only into a grab handle, but with any sport bar mounted accessory as an additional feature or any other vehicle component depending on the application without departure from the scope of the present invention.

Figure 11:
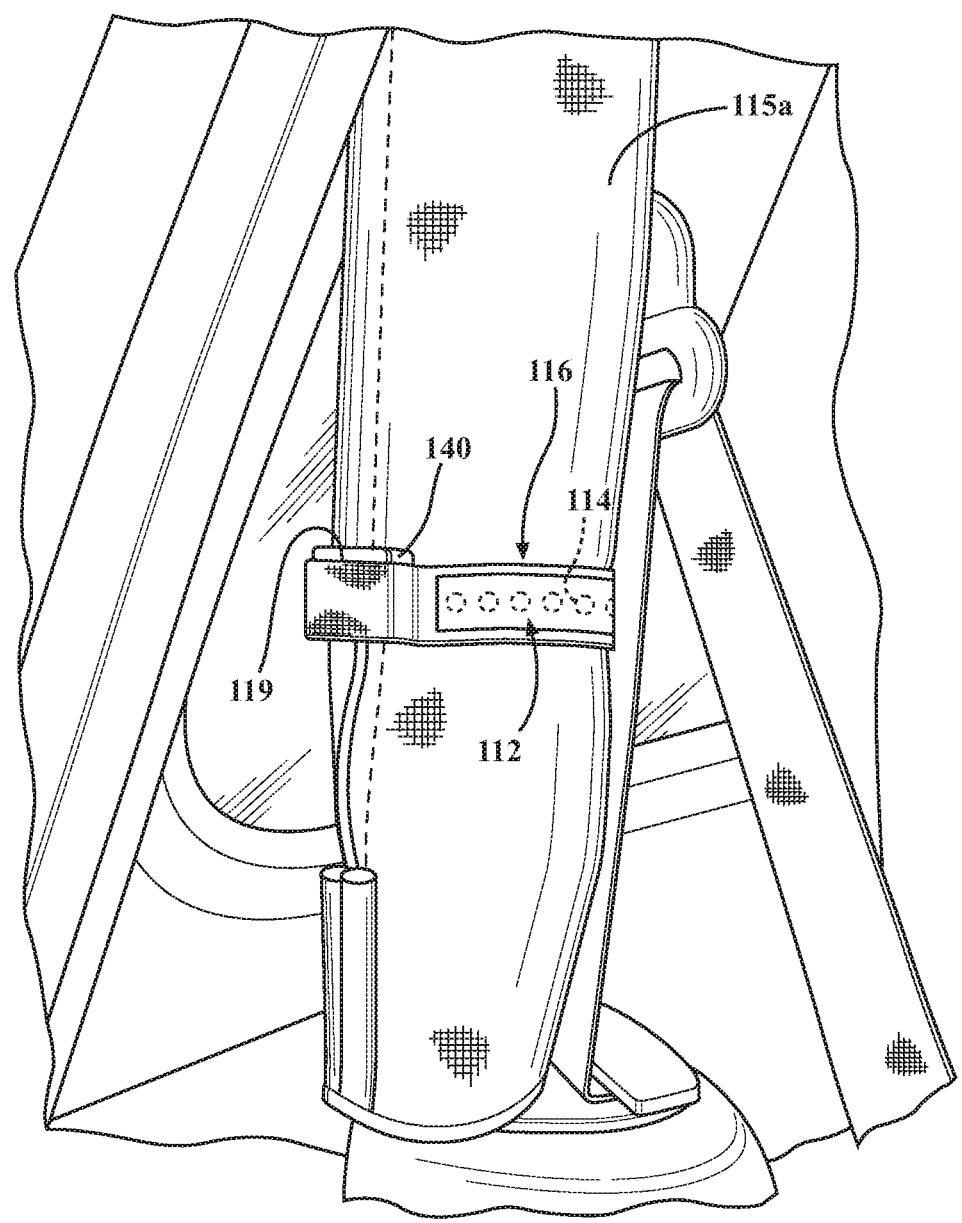
FIG. 11 is a perspective view of an accessory lighting assembly incorporating a lighting portion, attached to a sports bar, in accordance with the present invention.

FIG. 11 depicts an attachment portion 116 that is not connected to the grab handle assembly 134, wherein like numbers indicate like parts depicted in FIGS. 8-10. The attachment portion 116 has at least one lighting portion 112 with at least one lighting source 114. The housing 140 is pushed into the opening 119 in the strap 116 and held in the end pocket, as described previously. A user attaches the strap to a sport bar or any other vehicle component, as described previously, anywhere that additional lighting is desired. FIG. 11 depicts the attachment portion 116 connected to a sport bar 115a located in a cargo area toward the rear of the vehicle.

Figure 12:
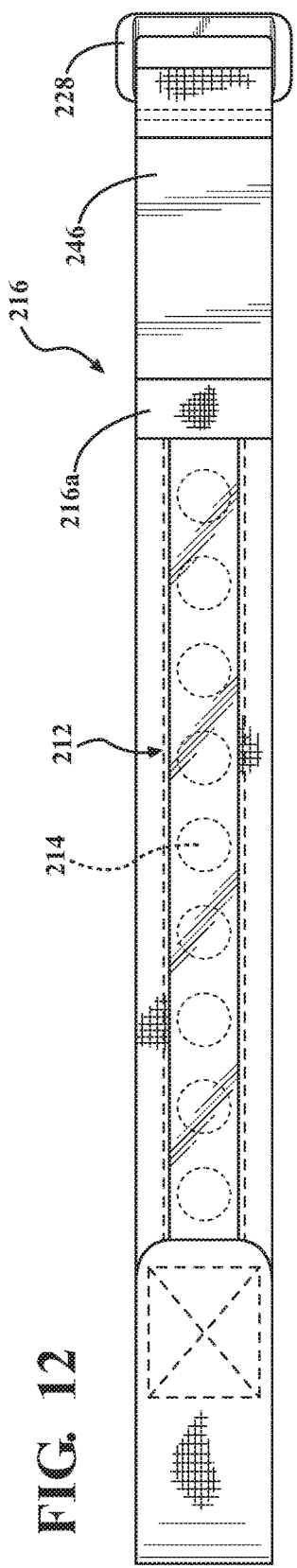
FIG. 12 is a rear elevation view of an accessory lighting assembly incorporating a lighting portion, in accordance with the present invention.
Figure 13:
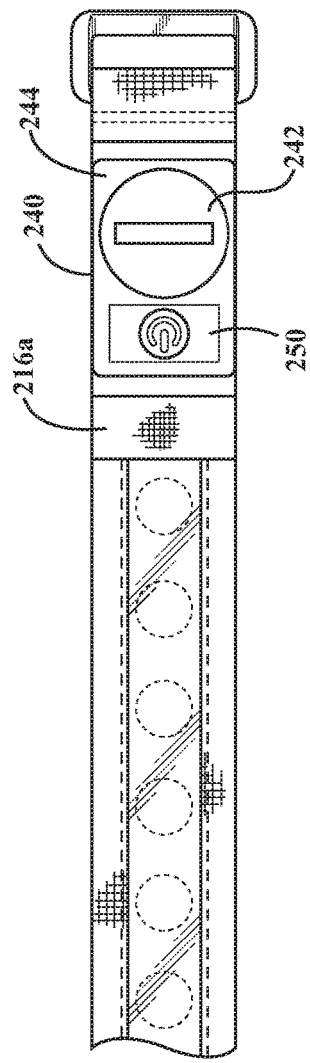
FIG. 13 is a front elevation view of the accessory lighting assembly of FIG. 12, in accordance with the present invention.
Figure 14:
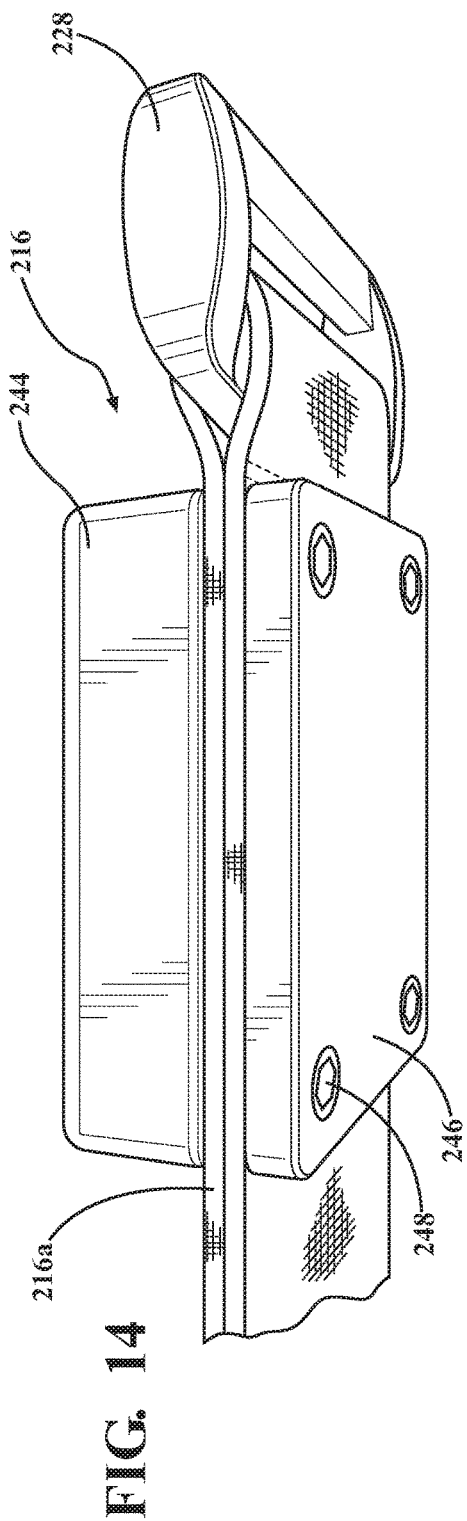
FIG. 14 is an enlarged perspective view of a portion of FIG. 12.

Referring now to FIGS. 12-14, there is depicted an accessory lighting assembly 210 that includes at least one lighting portion 212 with at least one lighting source 114, preferably, the lighting source 114 is at least one light emitting diode (LED), most preferably, a plurality of LEDs, which may be the same or different colors or alternating colors.

At least one attachment portion shown generally at 216, preferably including a strap 216a, attaches the assembly 210 to the vehicle. The at least one attachment portion 216 preferably attaches to a sport bar using at least one fastener 228. Alternatively, the at least one attachment portion 216 attaches to any other vehicle component/location desired, e.g., A-pillar, B-pillar, D-pillar, cross car members, without departure from the scope of the present invention. The accessory lighting assembly 210 is portable and selectively removable to allow placement, and replacement, anywhere in the vehicle that is desired by the user.

The lighting portion 212 is preferably inserted into the attachment portion 216, such as inserted into a web strap 216a. Alternatively, the lighting portion 212 is attached outside the attachment portion 216, e.g., sewn and/or adhered.

The lighting portion 212 is battery powered with a sealed, replaceable and/or rechargeable battery. A housing 240 containing at least one battery includes an access port and battery cover 242 for selectively replacing or recharging the battery. The battery powers the lighting portion 212. Alternatively, the lighting portion 212 is adaptable for solar power. The housing 240 is connected to the attachment portion 216, e.g., by at least one fastener and/or adhered. Preferably, the housing 240 is a two piece housing including a first half 244 connected to a second half 246 by at least one fastener 248, e.g., screws, with the strap of the attachment portion 216 sandwiched between the first and second halves 244,246 and the at least one fastener 248 extending through the strap. An ON/OFF button 50 or a switch for the lighting portion 12 is provided on the housing 40. The button 250 turns the lighting portion 212 on/off. It is understood that more than one lighting portion 212 can be connected to the housing 240 and controlled by the ON/OFF button 250.

Figure 15:
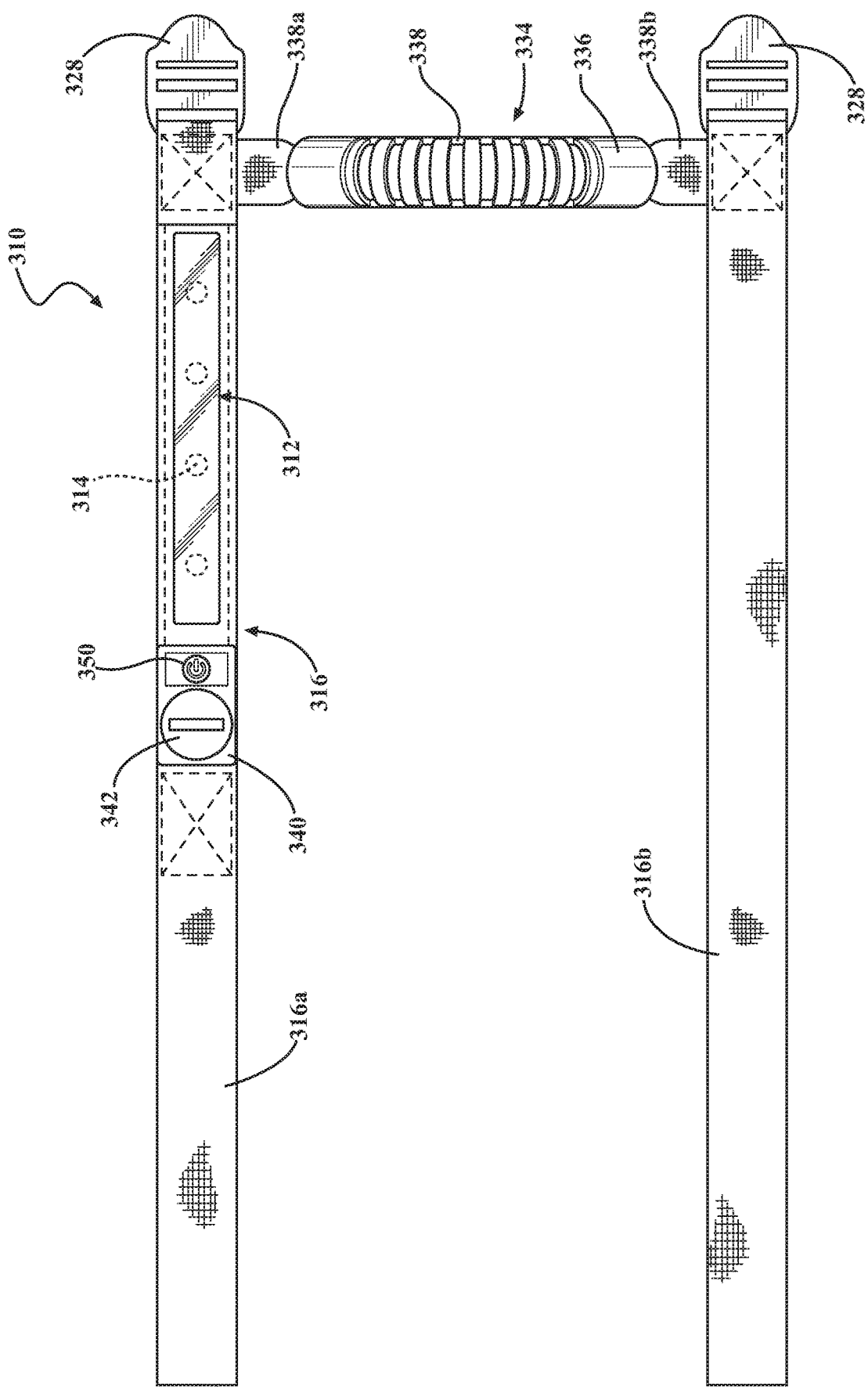
FIG. 15 is a front elevation view of an accessory lighting assembly incorporating a lighting portion, in accordance with the present invention.

Referring now to FIG. 15 generally, an accessory lighting assembly shown generally at 310 is provided, according to the present invention, which is an illuminating grab handle assembly. The accessory lighting assembly 310 has at least one lighting portion shown generally at 312. The lighting portion 312 includes at least one lighting source 314, preferably, the lighting source 314 is at least one light emitting diode (LED), most preferably, a plurality of LEDs, which may be the same or different colors or alternating colors. At least one attachment portion 316 attaches the assembly 310 to the vehicle, e.g., sport bar 15. Preferably, a plurality of attachment portions 316 attach the assembly 310 to the vehicle. FIG. 15 depicts two attachment portions 316, however, more or less attachment portions 316 can be used depending on the application without departure from the scope of the present invention.

At least one fastener 328, e.g., such as a buckle, snap, slide, D-ring, multi-prong fastener, loop, etc, is attached to the attachment portion 316, e.g., retention pocket sewn. The fastener 328 is sized to receive the attachment portion strap through at least one opening for attachment to the vehicle. An additional fastener for each attachment portion, e.g., such as hook and loop, is contemplated depending on the application without departure from the scope of the present invention.

The assembly 310 includes a grab handle portion shown generally at 334. The grab handle portion 334 includes a grip member 336 that a user can grasp for assistance when desired, such as to aid in getting into the vehicle. The grip 336 is connected to an attachment member 338 that is preferably a strap, e.g., fabric strap or web strap. Preferably, the attachment member 338 is connected to the attachment portion 316, e.g., sewn to the attachment portion 316, slid onto, etc. Most preferably, one end 338a of the attachment member 338 is sewn to one attachment portion 316a end (e.g., that does not have a lighting guide 312), and another end 338b of the attachment member is sewn to the other attachment portion 316a end (e.g., that does have the lighting guide 316).

The lighting portion 312 is battery powered with a sealed, replaceable and/or rechargeable battery. A housing 340 containing at least one battery includes an access port and battery cover 342 for selectively replacing or recharging the battery. Alternatively, the lighting portion 312 is adaptable for solar power. The housing 340 is connected to the attachment portion 316, e.g., by at least one fastener through two halves of the housing 340 with the strap material therebetween. An ON/OFF button 350 or a switch for the lighting portion 312 is provided on the housing 340 to turn the lighting portion 350 on/off.

Referring now to FIGS. 16-21 generally, a lighting and gripping handle assembly provides an easy one-piece solution to a problem that commonly uses two products. The grab bar/handle provides excellent lighting storage in an area that badly needs it in more of the recreational type vehicle such as jeep type vehicles or side by side UTV vehicles. Many interiors of vehicles or trailers do not provide an area of magnetic, smooth adhesive surface or ability to use screws or bolts for attachment of lights. This can also be used in dark lit areas such as pickup truck beds with caps, horse trailers, and recreational trailers. This is not limited to the automotive industry. The light is an LED light which is battery powered with easy on/off button on all products. In a preferred embodiment, the light has a replaceable battery or can have solar recharging.

Referring now to FIG. 16, there is depicted an accessory lighting assembly 410 that is a spring loaded sport bar grab handle, according to an aspect of the present invention. The spring loaded grab handle 360 attaches to a sport bar 15 with either metal clamping system shown generally at 362 or web strap like current. The spring loaded feature is not currently offered in the industry. Many SUVs and other vehicles have molded in spring loaded grab handles but molded into the headliner—not attached to sport bar.

The clamping system 362 preferably includes a bootstrap clamp 364 with a pair of clamping members 366,368 that are each clamped to the sport bar 15 with at least one clamp portion 370, e.g., "mason jar" clamp, or fastener, e.g., threaded fastener. The bootstrap clamp 364 generally follows the contour of the sport bar, preferably, with the clamp members 366,368 extending around the diameter of the sport bar 15.

At least one lighting portion shown generally at 372 is provided on the assembly 360. Preferably, the lighting portion 372 is a push button LED light with battery. The light is an LED light which is battery powered with easy on/off button on all products. In a preferred embodiment, the light has a replaceable battery or can have solar recharging.

Figure 18:
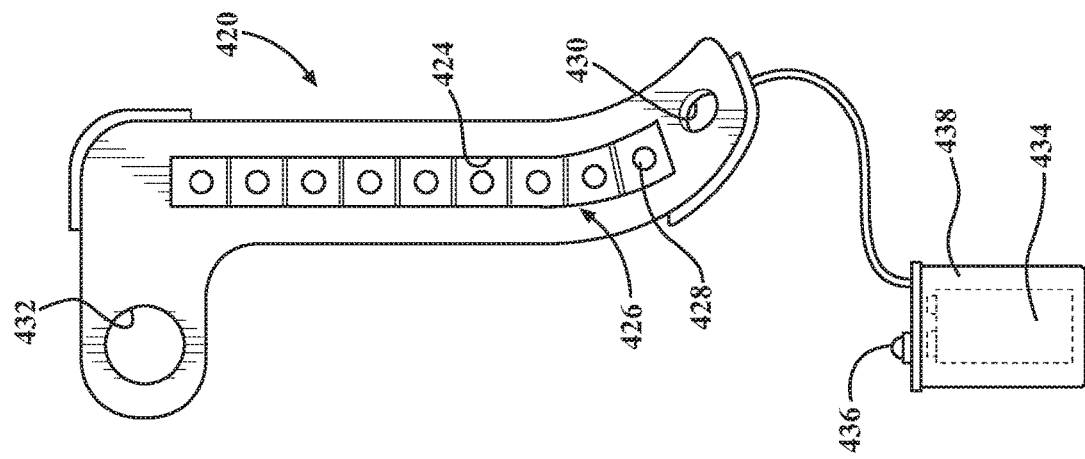
FIG. 18 is a side elevation of the lighting portion of FIG. 2.
Figure 17:
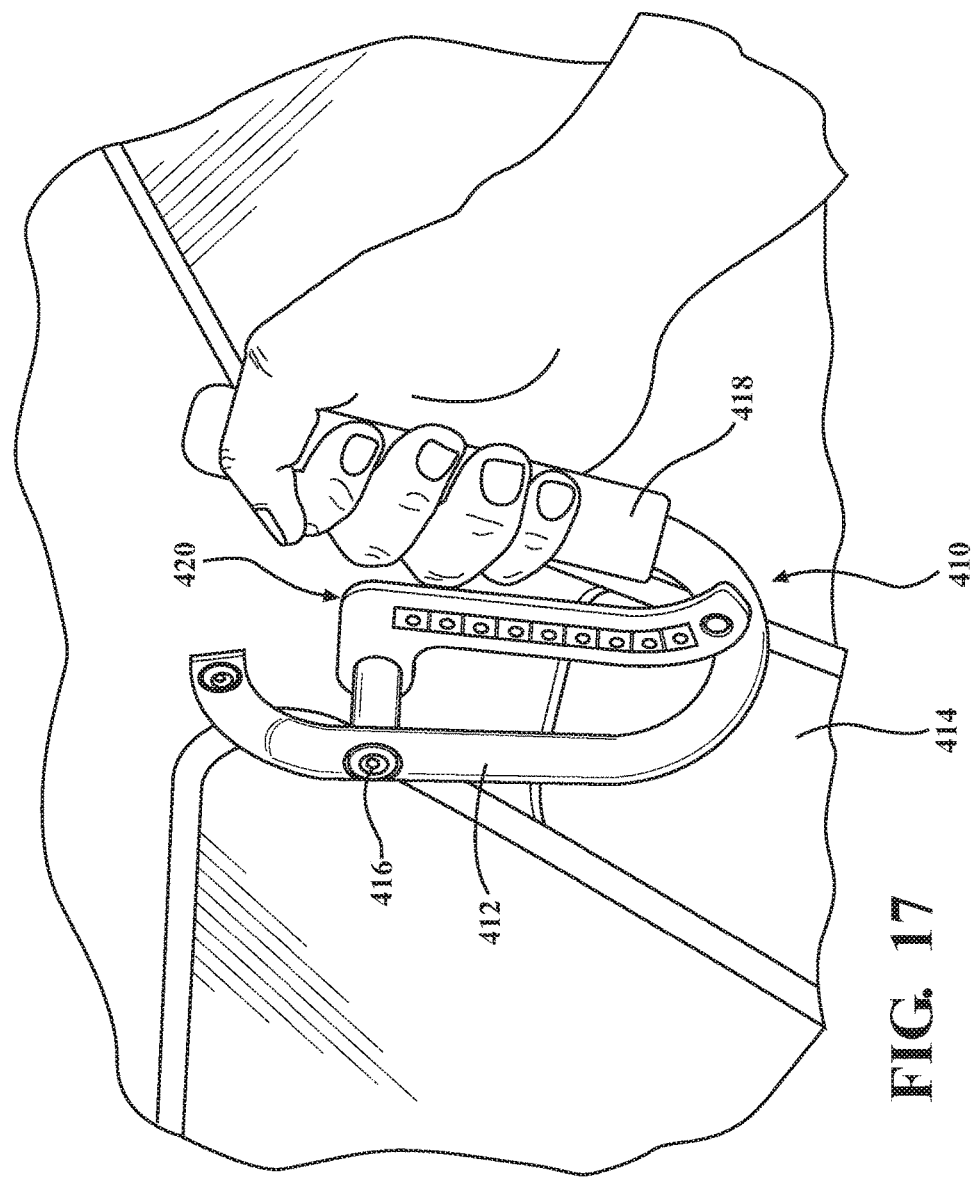
FIG. 17 is a perspective view of an accessory lighting assembly incorporating a lighting portion and "A" pillar mounted handle, according to an aspect of the present invention.

Referring now to FIGS. 17-18, there is depicted an accessory lighting assembly shown generally at 410 that is an Illuminated "A" pillar grab handle, according to an aspect of the present invention. At least one handle assembly 412 is connected to the A-pillar 414 by at least one fastener 416. The handle assembly 412 has a handle 418 for a user to grasp. The handle assembly 412 is formed of billet aluminum or other suitable material.

At least one lighting portion shown generally at 420 is provided on the assembly 410. The lighting portion is formed of billet aluminum or other suitable material. A channel 424 is formed in the lighting portion 420 to receive a lighting strip shown generally at 426 that has a plurality of light sources 428, preferably LEDs. A pair of through holes 430,432 are provided on the lighting portion body for mounting with at least one fastener to the grip assembly 412 body. A housing 438 with at least one battery 434 and ON/OFF button 436 or switch is provided and operably connected to the lighting portion 420.

Figure 19:
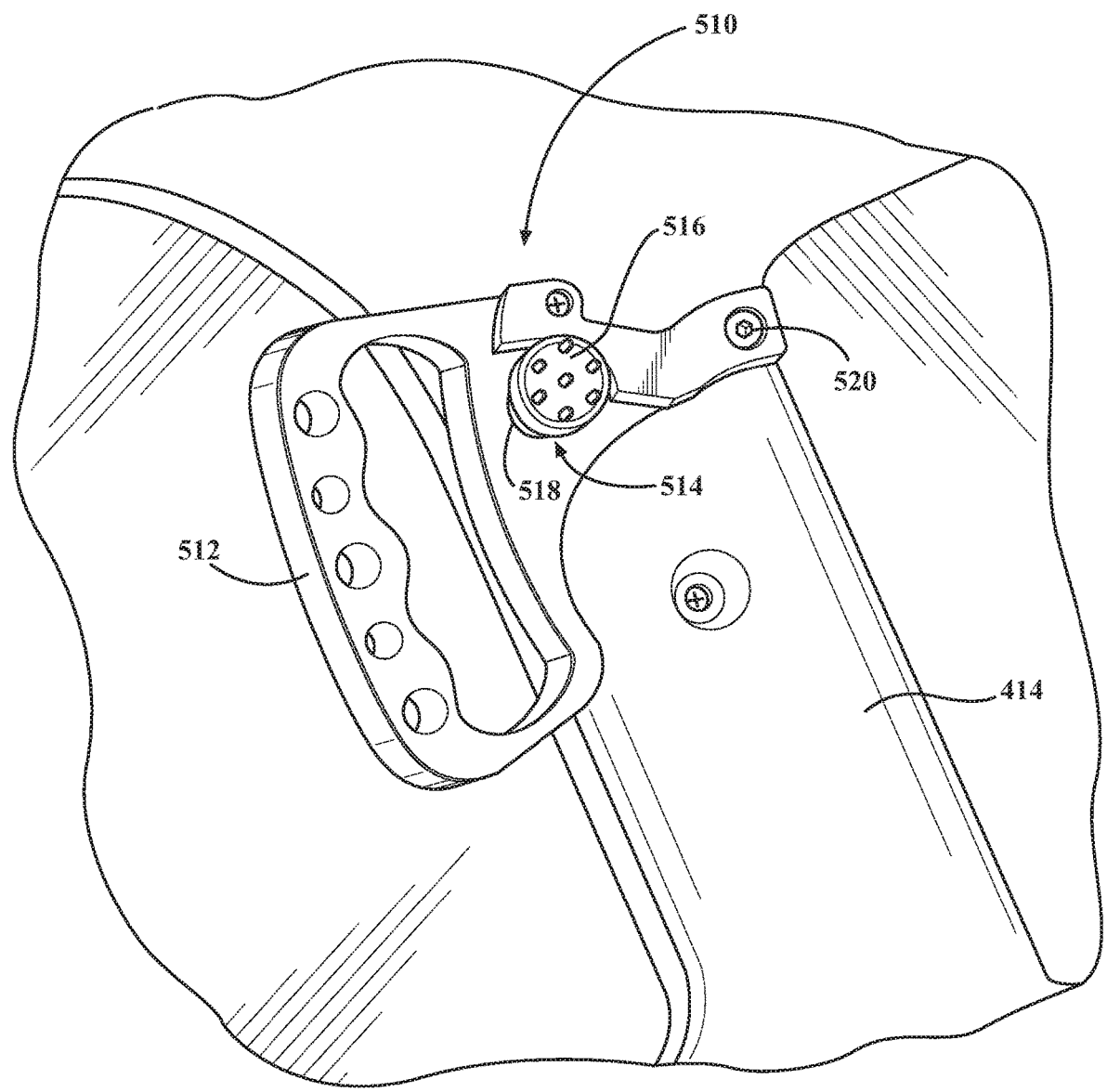
FIG. 19 is a perspective view of an accessory lighting assembly incorporating a lighting portion and "A" pillar mounted handle, according to an aspect of the present invention.

Referring now to FIG. 19, there is depicted an accessory lighting assembly shown generally at 510 that is an Illuminated "A" pillar grab handle, according to an aspect of the present invention. The assembly 510 is preferably a bolt-on handle. At least one handle 512 is connected to the A-pillar 414 by at least one fastener 520, e.g., bolt. The handle 512 has an area for a user to grasp.

At least one lighting portion shown generally at 514 includes a lighting source 516, e.g., at least one LED, and a screw in feature 518 for attachment of the lighting portion 514 to the handle 512. Preferably, the lighting portion 514 screw-in feature is a threaded insert. The lighting portion 514 is an anodized aluminum shell with a battery and the lighting source(s).

The assembly 510 can provide illumination of grab handle/bar insignia billet type construction combination.

Referring now to FIGS. 20-21, there is depicted an accessory lighting assembly shown generally at 610 that is an illuminated fabric sport bar grab handle, according to an aspect of the present invention. Fabric attachment of illuminated sport bar grab handle advantageous over conventional products. At least one grab handle strap shown generally at 612, preferably, a plurality of grab handle straps 612 (e.g., at least three), are connected to the sport bar 15 and to a grab handle assembly. The grab handle assembly includes a grip portion 622 with a plurality of apertures 616. At least one lighting source shown 614 is provided inside the grip portion 622. The lighting source 614 is preferably an LED strip 624. The lighting portion 614 is connected to a battery pack with at least one battery and an ON/OFF button 626 or switch.

Referring now to FIG. 22 an accessory lighting assembly shown generally at 710 is provided, according to the present invention, which is an illuminating grab handle assembly. The accessory lighting assembly 710 has at least one lighting portion, shown generally at 712, that includes at least one light strip 714.

At least one attachment portion shown generally at 716 attaches the assembly 710 to the vehicle. Preferably, a plurality of attachment portions 716 attach the assembly 710 to the vehicle. FIG. 22 depicts three attachment portions 716, however, more or less attachment portions 716 can be used depending on the application without departure from the scope of the present invention. The at least one attachment portion 716 attaches to a sport bar 15, e.g., such as a sport bar near a front or rear door, to assist occupant entry in/out of the vehicle. Alternatively, the at least one attachment portion 716 attaches to any other vehicle component/location desired, e.g., A-pillar, B-pillar, D-pillar, cross car members, without departure from the scope of the present invention. The accessory lighting assembly 710 is portable and selectively removable to allow placement, and replacement, anywhere in the vehicle that is desired by the user, e.g., vehicle cabins, automotive interior cabs, pickup beds, trailers, recreational vehicles, etc.

The at least one attachment portion 716 is preferably a strap, e.g., fabric strap or web strap, having at least one fastener, preferably, at least two fasteners, connected to the strap, e.g., sewn. Preferably, a first fastener shown generally at 718 includes a hook portion 720 and loop portion 722 attached to the attachment portion 716. A second fastener 724, e.g., such as a buckle, snap, slide, D-ring, multi-prong fastener, loop, etc, is attached to the attachment portion 716, e.g., retention pocket sewn. The second fastener 724 is sized to receive the attachment portion 716 strap through at least one opening 726 for attachment to the vehicle.

A body portion 728 of the assembly 710, e.g., a fabric panel, is attached to the at least one attachment portion 716. Preferably, the body portion 710 is attached to three attachment portions 716 in a direction transverse to the longitudinal axis of the three attachment portions 716. The attachment portions are spaced a predetermined distance apart and sewn, or otherwise suitably connected, to the body portion 728.

The at least one lighting portion 712 is connected to the body portion 728 and/or attachment portion(s) 16, e.g., sewn and/or adhered. Preferably, the light strip 714 is sewn to at least the body portion 728. At least one light strip 714 is attached generally parallel to the longitudinal axis of the body panel 712 or generally transverse to the longitudinal axis of the at least one attachment portion 716. Alternatively, at least one light strip 714 is attached generally parallel to the longitudinal axis of the at least one attachment portion 716, or one light strip 714 is generally perpendicular to one or more additional light strips 714, or one or more light strips 714 are generally parallel to each other. It is understood that, alternatively, the lighting portion 12 is a rope light like or any other suitable lighting of any kind for accessory illumination depending on the application without departure from the scope of the present invention.

The assembly 710 includes a grab handle portion shown generally at 730. The grab handle portion 730 includes a grip member 732 that a user can grasp for assistance when desired, such as to aid in getting into the vehicle. The grip 732 is connected to at least one attachment member 734 that is preferably a strap, e.g., fabric strap or web strap. Preferably, the attachment member 734 is connected to the attachment portion 716, e.g., sewn to the attachment portion 716, or selectively slid onto the attachment portion 716, etc. One end 734a of the attachment member 734 is attached, e.g., sewn or slid, to one end attachment portion 716a, and another end 734b of the attachment member is attached, e.g., slid or sewn, to the other end attachment portion 716b in respective predetermined locations. Preferably, the ends 716a,716b both include a sewn loop 734c to slide the ends 734a,734b of the grab handle portion 732 onto the respective attachment portions 716a,716b. This allows a simple attachment and adaptability/adjustability of the assembly 710 to various vehicles and vehicle attachment locations. If one or more middle attachment portions 716c are used, preferably the attachment member 734 is not connected to the middle attachment portion 716c so that a user has space to grasp the grip member 732. Additional or alternative lighting, e.g., grab handle grip area lighting, is contemplated depending on the application without departure from the scope of the present invention.

The lighting portion 712 is battery powered with a sealed, replaceable and/or rechargeable battery. At least one housing 736 containing at least one battery includes an access port and battery cover 738 for selectively replacing or recharging the battery. The battery powers the lighting portion 712. Alternatively, the lighting portion 712 is adaptable for solar power. The housing 736 is connected to at least one attachment portion 716 and/or body portion 728, e.g., by at least one fastener, sewn into a pocket, and/or adhered. Preferably, each housing 736 is connected to the outer attachment portion 716a or 716b over the body portion 728. Preferably, the housing 736 is a two piece housing, as set forth previously, including a first half 44 connected to a second half 46 by at least one fastener 48, e.g., screws, with the strap of the attachment portion 716 and the body portion 728 fabric panel sandwiched between the first and second halves 44,46 and the at least one fastener 48 extending through the strap/panel. While the housing 736 is depicted connected to the outer attachment portion 716a and body portion 728, it is understood that the housing 736 can be connected at any alternative location on the assembly 710 depending on the application without departure from the scope of the present invention. It is also understood that more than one lighting portion 712 can be connected to the housing 712 and powered by the battery.

An ON/OFF button 740 or a switch for the lighting portion 712 is provided on the housing 736. The button 740 turns the lighting portion 712 on/off. It is understood that more than one lighting portion 712 can be connected to the housing 736 and controlled by the ON/OFF button 740.

In accordance with any embodiment set forth previously, preferably, the lighting portion includes at least one LED. It is understood that a plurality of LEDs can be used. The LEDs are white and/or any color LED. Alternating colors, e.g., automatically changing at predetermined intervals, are also contemplated without departure from the scope of the present invention. Dimming or a plurality of illumination settings, automatic based on predetermined condition(s) and/or manually set, are further contemplated without departure from the scope of the present invention. Incorporating an electronic control unit is contemplated without departure from the scope of the present invention. Incorporating at least one sensor is contemplated without departure from the scope of the present invention. Sequencing various lighting devices is contemplated without departure from the scope of the present invention. While a battery source is described above, it is understood that incorporating solar powering for the lighting source, is contemplated without departure from the present invention. Hard wiring lighting devices is contemplated without departure from the scope of the present invention.

Suitable LED light option types and combinations are contemplated. A short strap that wraps around the SUV sport bar (and/or UTV sport bar, and/or any other vehicle, e.g., with a cloth headliner, grab handle, etc) with integrated LED lights it contemplated without departure from the scope of the present invention. The short strap or integrated feature could be mounted anywhere in the vehicle interior with access to the sport bar (front seats, back seats, cargo area, etc.).

The device cover helps to diffuse the light. It can be frosted or colored to influence the interior light brightness but would likely be white. The on/off button is hidden by the strap material. It could be exposed if the strap was integrated into the battery and circuit box.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An accessory lighting assembly adapted for a soft top vehicle, comprising:
   at least one attachment portion including at least one metal clamp member configured to attach the accessory lighting assembly to an inflexible roll bar of the vehicle; and
   at least one integrated lighting portion for selectively providing lighting to the interior of the vehicle.

2. The accessory lighting assembly of claim 1, further comprising a grab handle for allowing a driver or passenger a handle for grabbing onto when desired.

3. The accessory lighting assembly of claim 2, wherein the assembly includes a plurality of said attachment portions and the grab handle is operably coupled to two of said attachment portions.

4. The accessory lighting assembly of claim 2, wherein the lighting portion is integrally part of said grab handle.

5. The accessory lighting assembly of claim 1, wherein the at least one lighting portion includes at least one light emitting diode.

6. The accessory lighting assembly of claim 1, further comprising at least one power source and ON/OFF button operably coupled to the at least one lighting portion.

7. An accessory lighting assembly adapted to couple to a vehicle, comprising:
   at least one lighting portion including at least one lighting source that is selectively turned on/off; and
   at least one attachment portion operably coupled to the lighting portion, said at least one attachment portion including at least one metal clamp configured to selectively attach to an inflexible roll bar in the vehicle.

8. The accessory lighting assembly of claim 7, wherein the lighting source is at least one light emitting diode.

9. An accessory lighting assembly adapted to selectively attach a vehicle, comprising:
   at least one integrated lighting portion including at least one battery powered lighting source; and
   a plurality of attachment portions each incorporating a metal clamp member configured for selectively attaching the accessory lighting assembly to an inflexible roll bar of the vehicle, wherein a first attachment portion is operably connected to one end of a grab handle and a second attachment portion is operably connected to the other end of the grab handle, said grab handle allowing a user a handle grip for grabbing onto inside the vehicle when desired.

* * * * *